United States Patent
Hecht et al.

(10) Patent No.: US 12,145,202 B2
(45) Date of Patent: Nov. 19, 2024

(54) PARTING BLADE AND TOOL HOLDER THEREFOR

(71) Applicant: ISCAR, LTD., Tefen (IL)

(72) Inventors: Gil Hecht, Nahariya (IL); David Ben Harouche, Nahariya (IL); Yakov Kvartovsky, Maalot (IL); Dmitry Gal, Maalot (IL)

(73) Assignee: ISCAR, LTD., Tefen (IL)

( * ) Notice: Subject to any disclaimer, the term of this patent is extended or adjusted under 35 U.S.C. 154(b) by 25 days.

(21) Appl. No.: 17/845,360

(22) Filed: Jun. 21, 2022

(65) Prior Publication Data

US 2022/0314337 A1 Oct. 6, 2022

Related U.S. Application Data

(63) Continuation of application No. 16/386,953, filed on Apr. 17, 2019, now Pat. No. 11,396,050, which is a continuation-in-part of application No. PCT/IL2018/051254, filed on Nov. 20, 2018.

(60) Provisional application No. 62/741,619, filed on Oct. 5, 2018, provisional application No. 62/589,132, filed on Nov. 21, 2017.

(51) Int. Cl.
| | | |
|---|---|---|
| B23B 29/04 | (2006.01) | |
| B23B 27/04 | (2006.01) | |
| B23B 27/08 | (2006.01) | |
| B23B 27/10 | (2006.01) | |

(Continued)

(52) U.S. Cl.
CPC ............ *B23B 29/043* (2013.01); *B23B 27/04* (2013.01); *B23B 27/045* (2013.01); *B23B 27/08* (2013.01); *B23B 27/10* (2013.01); *B23B 29/046* (2013.01); *B23B 29/20* (2013.01); *B23B 2205/02* (2013.01); *B23B 2205/125* (2013.01); *B23B 2210/08* (2013.01); *B23B 2250/12* (2013.01); *B23P 15/28* (2013.01)

(58) Field of Classification Search
CPC ....... B23B 29/043; B23B 27/08; B23B 27/04; B23B 29/04; B23B 29/06; B23B 29/046
See application file for complete search history.

(56) References Cited

U.S. PATENT DOCUMENTS

| | | | |
|---|---|---|---|
| 2,836,240 A | 5/1958 | Nuding | |
| 3,238,607 A | 3/1966 | Wallbom | |

(Continued)

FOREIGN PATENT DOCUMENTS

| | | |
|---|---|---|
| DE | 8513350 U1 | 6/1985 |
| DE | 102015014907 | 5/2017 |
| FR | 2 542 229 | 9/1984 |

OTHER PUBLICATIONS

International Search Report dated Mar. 6, 2019, issued in PCT counterpart application (No. PCT/IL2018/051254).

(Continued)

*Primary Examiner* — Alan Snyder
(74) *Attorney, Agent, or Firm* — Womble Bond Dickinson (US) LLP

(57) ABSTRACT

A tool holder includes a tool shank and a tool head connected to the tool shank. The tool head has a rear surface. An insert seat or a blade pocket is partially formed on both the tool head and the tool shank, and extends rearwardly of the tool head's rear surface. Adjacent to at least a portion of a shank side surface there is a reinforcement portion connecting the shank side surface and the tool head.

31 Claims, 25 Drawing Sheets

(51) Int. Cl.
    *B23B 29/20*     (2006.01)
    *B23P 15/28*     (2006.01)

(56) References Cited

U.S. PATENT DOCUMENTS

| | | | | |
|---|---|---|---|---|
| 3,934,320 | A * | 1/1976 | McCreery | B23B 27/04 |
| | | | | 407/107 |
| 4,035,889 | A | 7/1977 | Mccreery | |
| 7,578,640 | B2 | 8/2009 | Hecht | |
| 2012/0099935 | A1 * | 4/2012 | Hecht | B23B 27/1614 |
| | | | | 407/103 |
| 2013/0156516 | A1 | 6/2013 | Hecht | |
| 2014/0294525 | A1 * | 10/2014 | Hecht | B23B 27/1651 |
| | | | | 407/103 |
| 2018/0318935 | A1 * | 11/2018 | Kobayashi | B23B 29/043 |
| 2019/0084053 | A1 * | 3/2019 | Vöge | B23B 29/043 |
| 2019/0111493 | A1 | 4/2019 | Miyashita | |

OTHER PUBLICATIONS

Written Opinion dated Mar. 6, 2019, issued in PCT counterpart application (No. PCT/IL2018/051254).

* cited by examiner

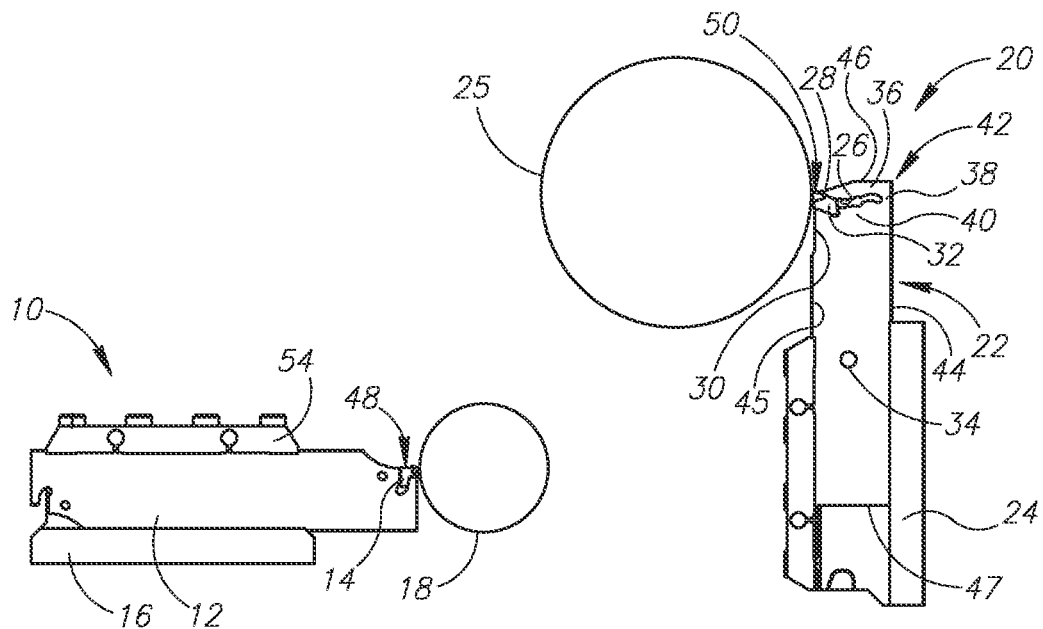
FIG.1 PRIOR ART
FIG.2 PRIOR ART
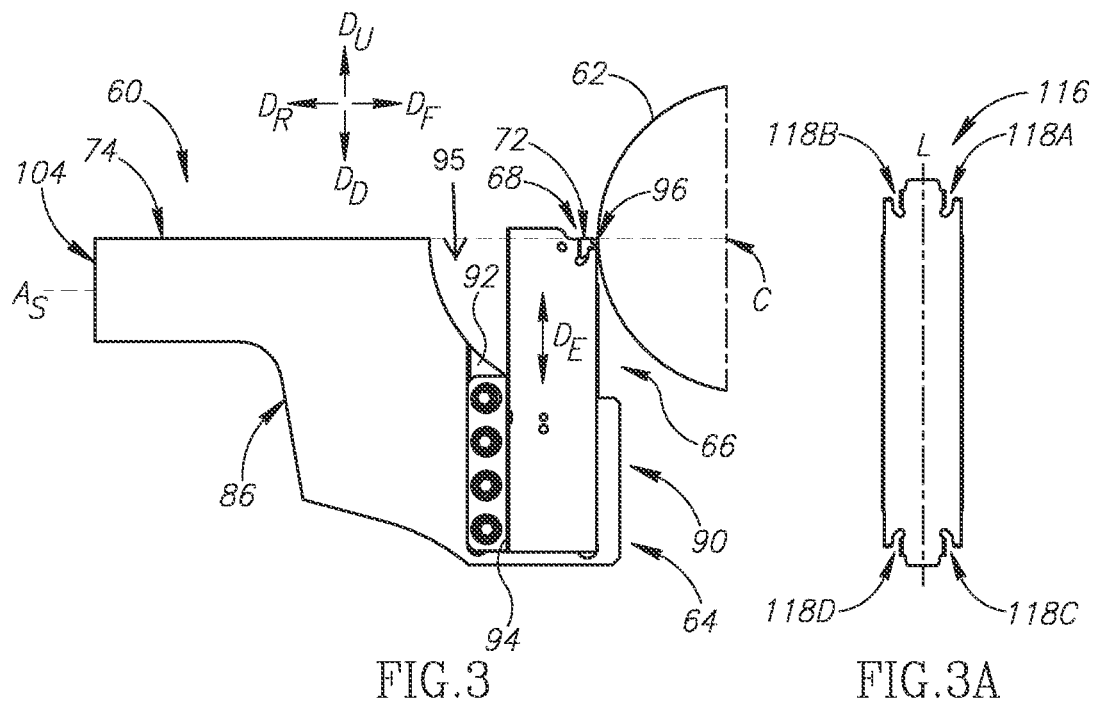
FIG.3
FIG.3A

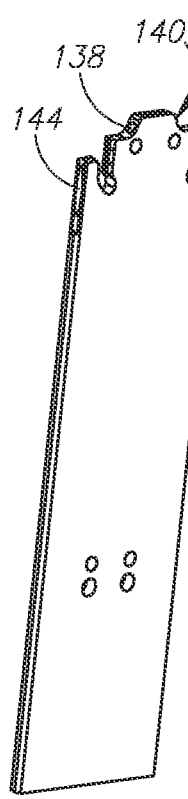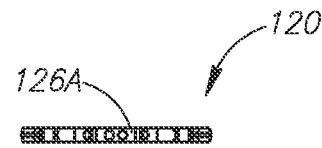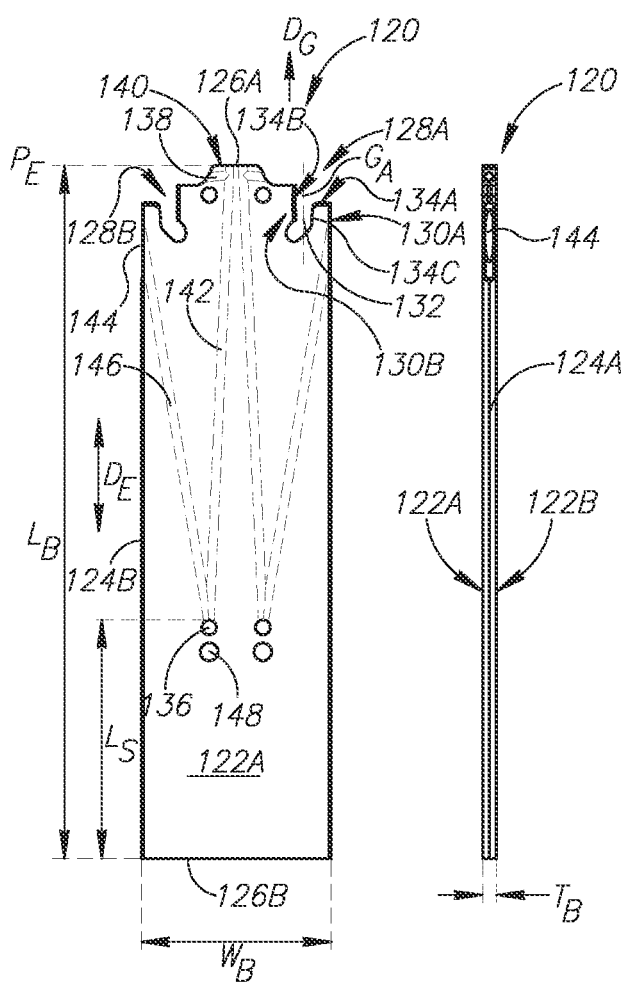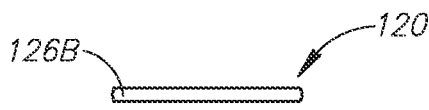

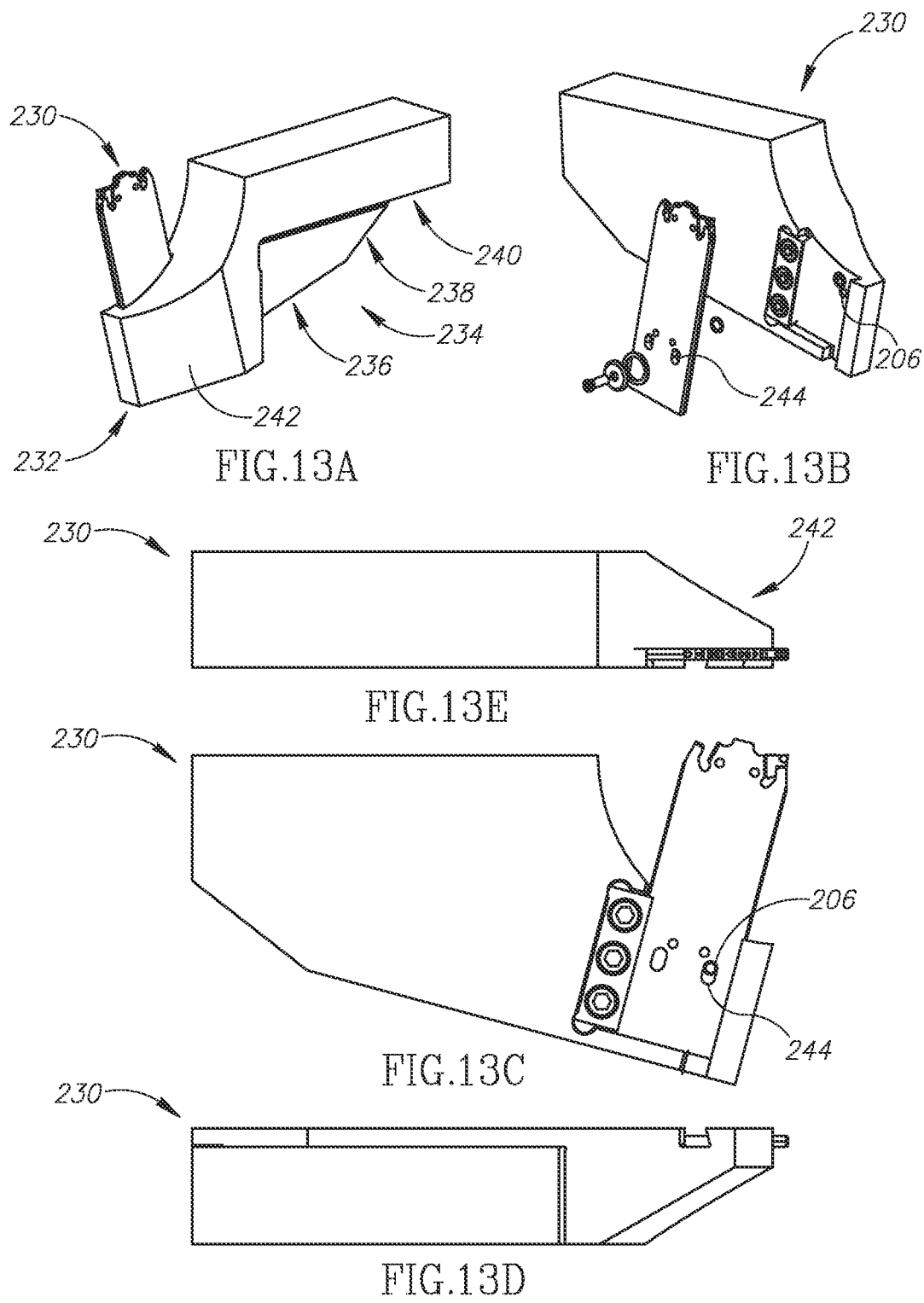

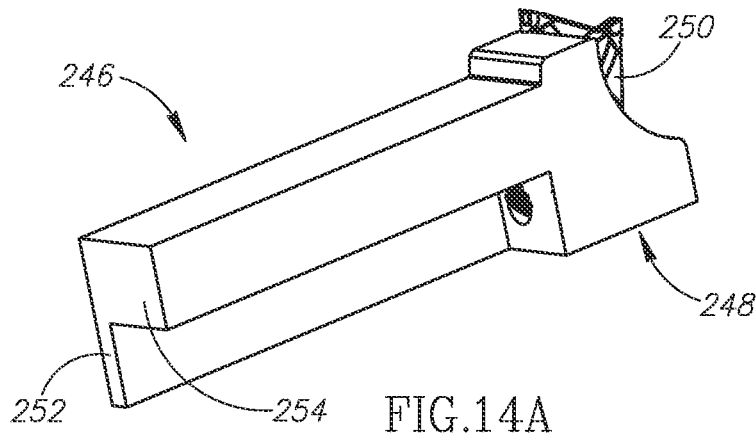
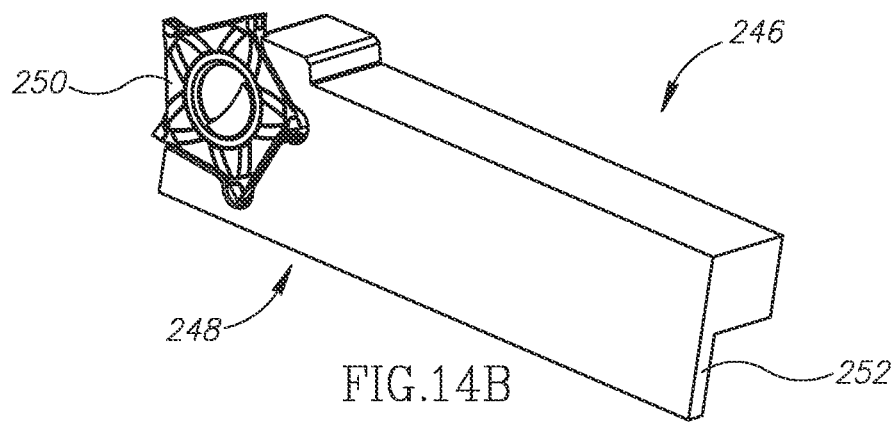
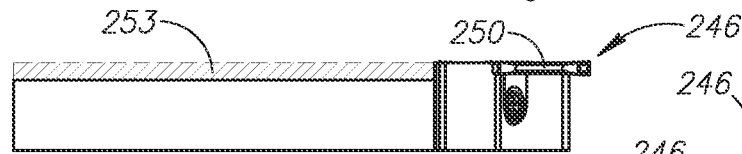
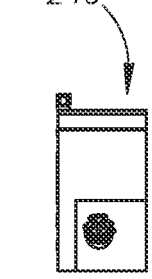
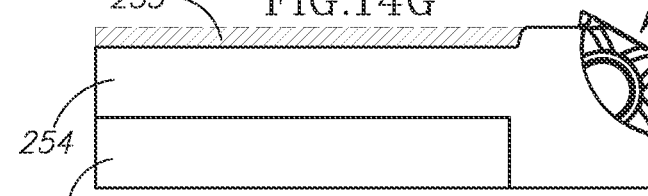
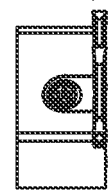
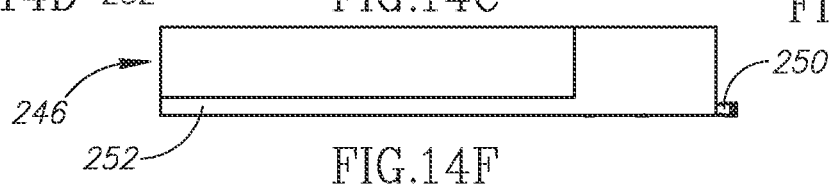

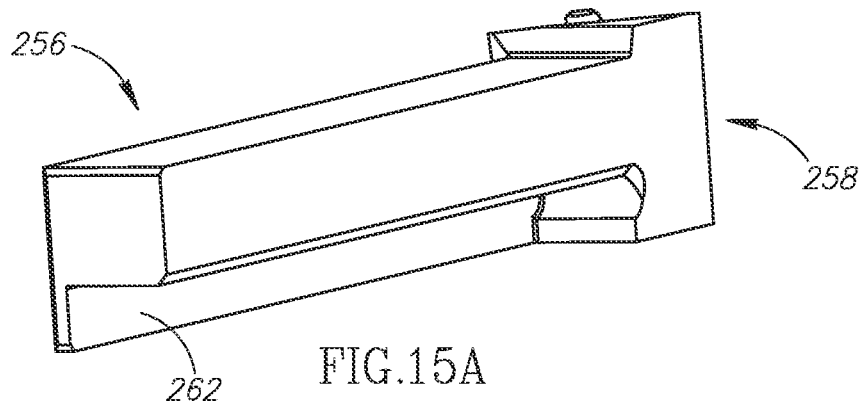
FIG.15A
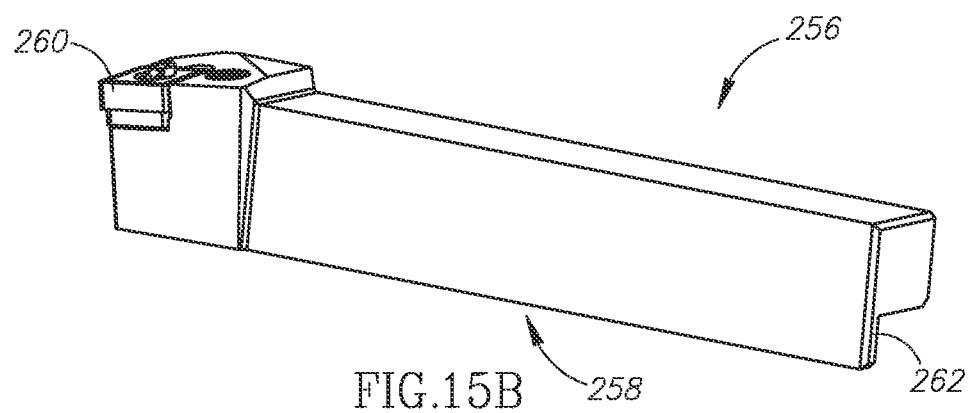
FIG.15B
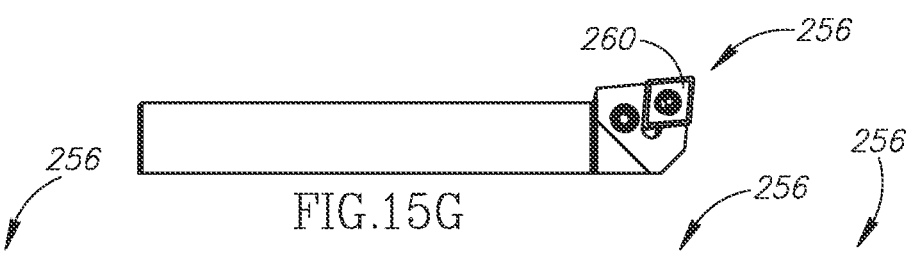
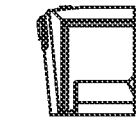
FIG.15D
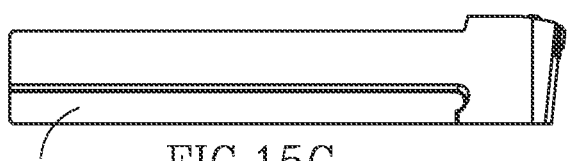
FIG.15C
FIG.15E
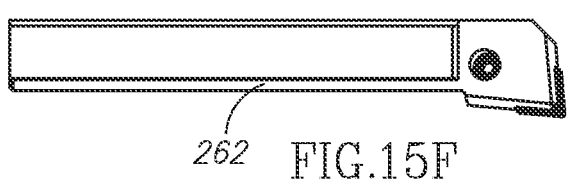
FIG.15F

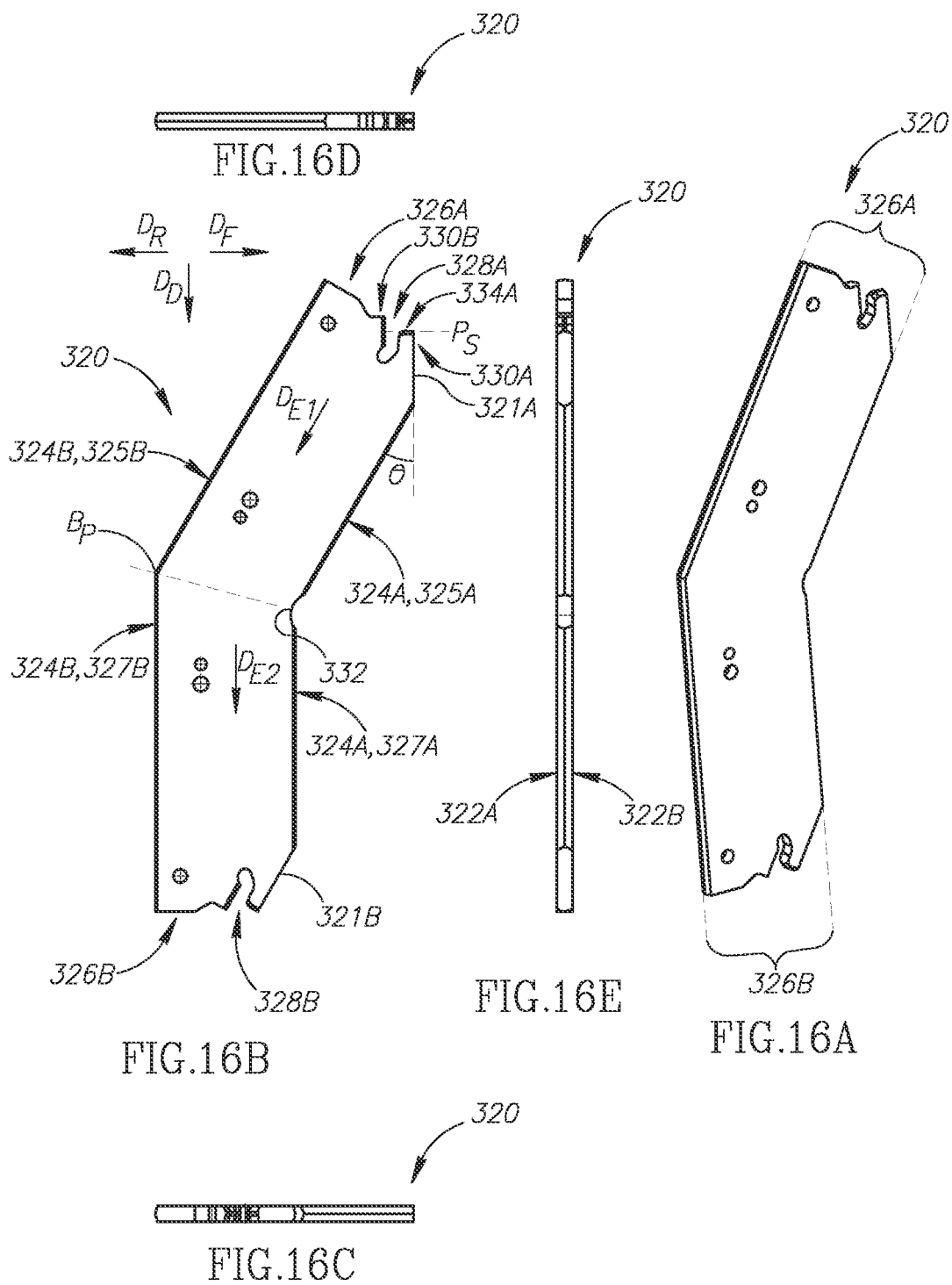

PARTING BLADE AND TOOL HOLDER THEREFOR

RELATED APPLICATIONS

This is a Continuation of U.S. patent application Ser. No. 16/386,953 filed 17 Apr. 2019, now U.S. Pat. No. 11,396,050, which is a Bypass Continuation-in-Part of PCT/IL2018/051254, filed 20 Nov. 2018. Priority is claimed to U.S. Provisional Patent Application No. 62/589,132 filed Nov. 21, 2017 and to U.S. Provisional Patent Application No. 62/741,619 filed Oct. 5, 2018. The contents of the aforementioned applications are incorporated by reference in their entirety.

FIELD OF THE INVENTION

The subject matter of the present invention relates to a parting blade (also referred to as "blade" hereinafter) and tool holder (together with the blade called a "cutting tool assembly") configured for relatively long overhang applications or large depth of cut applications.

BACKGROUND OF THE INVENTION

As the name suggests, parting blades can be considered to have a 'blade' shape. More specifically, parting blades have narrow elongated bodies, configured for metal-cutting operations, in particular parting and slitting operations.

More precisely, the elongated blade shape is defined as follows. An elongated parting blade comprises opposing first and second side surfaces extending between first and second longitudinal edges and between first and second end edges which are shorter than the longitudinal edges. A blade thickness dimension defined between the first and second side surfaces is smaller than a blade width dimension defined between the longitudinal edges. The blade width dimension is smaller than a blade longitudinal dimension defined between the first and second end edges.

Such parting blades also comprise an insert seat configured to hold a cutting insert (also referred to as "insert" hereinafter). Parting blades are elongated making them particularly suitable for relatively long overhang parting applications. It is known that longer overhang applications are more susceptible to bending and vibrations than relatively shorter overhang applications.

Alternative to the terminology of a long overhang is reference to the workpiece being machined. Accordingly, the present application provides a solution for machining operations requiring a large depth of cut (e.g. a workpiece with a diameter greater than 50 mm, preferably greater than 60 mm or 70 mm, even up to, for example 130 mm). The embodiments hereinafter are not actually limited to said 130 mm depth of cut, but such diameter size is rare.

Tool holders configured for holding such parting blades do so along the periphery thereof, specifically along the longitudinal edges thereof, via the use of opposing jaws of the tool holder. The longitudinal edges and jaws are configured with tapered constructions to allow clamping and sliding motion of the parting blade relative to the tool holder to provide different overhang lengths.

One such prior art cutting tool assembly 10 is described in EP 2822720B1, assigned to the present applicant, and is schematically exemplified in FIG. 1. This cutting tool assembly 10 shows a commonly used orientation of a parting blade 12, cutting insert 14 and tool holder 16, configured for parting a workpiece 18. This publication also discloses the use of high pressure coolant through, i.e. internal to, the tool holder and the parting blade to cool the insert.

Another prior art cutting tool assembly 20 is disclosed in the Sandvik Group Magazine entitled "Meet Sandvik #2-2017" (page 7), hereinafter called "the magazine". A parting blade 22 according to this disclosure has been schematically reproduced in FIG. 2 and shown held by a tool holder 24 identical to that shown in FIG. 1 (it is noted that in the magazine a different tool holder is disclosed). It should be understood that this reproduction is to assist basic understanding only, and the comments generally made hereinafter directed to "FIG. 2" are to be directed at the disclosure in the magazine, should there be any inaccuracy. Additionally, a workpiece 25 has been schematically added for understanding. The parting blade 22 in the magazine differs primarily from the parting blade 12 in FIG. 1, in that the insert seat 26 of the parting blade is rotated 90° to use the feed motion in the y-axis. Stated differently, the rake surface 50 of the parting blade 22 in FIG. 2 is basically perpendicular to an elongation of the parting blade 22, whereas the rake surface 48 of the parting blade 12 is basically parallel to an elongation of the parting blade 12.

Said pocket orientation is alleged to provide better stability and less vibration since the cutting force is directed more towards the longitudinal extension of the parting blade and thereby allow significantly higher feed rates. The parting blade 22 also shows a parting blade configured for coolant therethrough, as shown by the coolant outlets (the basic positions of which being schematically designated 28 and 30) visible adjacent to a cutting insert 32 and a sealing device 34 mounted on the blade 22.

It is an object of the present invention to provide a new and improved parting blade, and tool holder, and tool cutting assembly.

SUMMARY OF THE INVENTION

In accordance with a first aspect of the present invention, there is provided an elongated parting blade having a basic elongation direction and comprising: opposing first and second side surfaces extending between first and second longitudinal edges and also extending between opposing first and second end edges which are shorter than and extend transverse to the first and second longitudinal edges; and an insert seat associated with the first longitudinal edge and the first end edge; the insert seat comprising first and second insert jaws which form an insert-receiving gap (also referred to as "gap" hereinafter) at a location they oppose each other, the insert-receiving gap opening out in a direction towards the first end edge.

In accordance with a second aspect of the present invention, there is provided an elongated parting blade having a basic elongation direction and comprising: opposing first and second side surfaces extending between first and second longitudinal edges and also extending between opposing first and second end edges which are shorter than and extend transverse to the first and second longitudinal edges; and an insert seat associated with the first longitudinal edge and the first end edge; the insert seat being configured with a lower seat abutment surface formed by a first longitudinal edge extremity of the first longitudinal edge, and a rear seat abutment surface formed by a first end edge extremity of the first end edge; wherein the lower seat abutment surface and the rear seat abutment surface extend non-parallel to each other.

It will be understood that both the first and second aspects both define a similar concept in alternative ways, namely an insert seat configuration, to provide the advantages over both of the prior art parting blades in FIGS. 1 and 2.

To elaborate, the insert seat in FIG. 1 provides better chip evacuation than that shown in FIG. 2, because there is no insert jaw 36 (FIG. 2) located above the rake surface 48 of the cutting insert 14, allowing more space for the chips to flow unimpeded. However, the theoretical additional stability of the parting blade 22 in FIG. 2 is not provided. By contrast, the insert seat 26 in FIG. 2 has a coolant outlet 28 extremely close to the cutting insert (i.e. which proximity is due to the existence of the insert jaw 36 which comprises the coolant outlet 28) and the parting blade 22 thereof has the alleged additional stability but lacks the additional chip evacuation capability of the configuration in FIG. 1.

Yet another independent advantage that has been found, is that for high feed applications (e.g. greater than 0.20 mm/rev), the use of an elastic jaw is more disadvantageous than in normal feed applications (e.g. lower than or equal to 0.20 mm/rev) since it quickly loses the elasticity thereof due to the increased forces. It will be understood that an insert seat for high feed devoid of an elastic jaw is an independent benefit in itself.

Accordingly, a third aspect is a parting blade for high feed applications (e.g. equal to or higher than 0.20 mm/rev) or relatively long depth of cut (e.g. >50 mm), the parting blade comprising an insert seat configured with a lower seat abutment surface and a rear seat abutment surface; wherein the lower seat abutment surface and the rear seat abutment surface extend non-parallel to each other. Preferably, a lower seat abutment surface can extend basically perpendicular to the rear seat abutment surface. More preferably, the rear seat abutment surface can extend basically at a right angle to the lower seat abutment surface. To clarify, said parting blade is devoid of a jaw extending above the insert seat (i.e. extending opposite the lower seat abutment surface or even over only a gap formed between the lower seat abutment surface and the rear seat abutment surface).

It will be understood that said parting blade with insert seat devoid of said jaw extending over the gap or lower seat abutment surface is an independently advantageous feature which can be applicable to any of the other aspects. However, it will also be understood that the other aspects are not limited to this specific type of insert seat.

Even though the present invention as shown in FIG. 3 does not have the advantageous benefit of a coolant outlet as proximate to a cutting edge on the side of the rake surface as that shown in FIG. 2, it is believed the advantageous chip evacuation capability outweighs this detriment, especially for such parting blade that may be used for comparatively high feed rates and the associated chips.

According to any of the above aspects, preferably, a lower seat abutment surface can extend basically perpendicular to the elongation direction and a rear seat abutment surface can extend basically parallel to the elongation direction. More preferably, the rear seat abutment surface can extend basically at a right angle to the lower seat abutment surface and can extend basically parallel to the elongation direction.

According to any of the above aspects, there can be provided an additional insert seat associated with the second longitudinal edge and the first end edge. Preferably the additional insert seat has a corresponding insert seat construction.

It will be noted that in the configuration in FIG. 2, the flexible connection 38 of the first and second insert jaws 36, 40 is located close to an opposing corner 42 associated with the second longitudinal edge 44 and the first end edge 46. It will be understood that such configuration only allows a single insert seat associated with the first end edge 46 (noting that the first edge is the shorter edge of the parting blade and hence is relatively closely located). By contrast, referring to FIG. 3, since the comparative flexible connection on the insert jaws is not located proximate to an adjacent corner of the first edge, a second insert can be provided which is associated with the first edge. It will be understood that by providing additional insert seats on a single parting blade, the tool life of the parting blade is significantly increased. This is an independent benefit to the present invention, in addition to the improved chip flow discussed above.

According to any of the above aspects, there can be provided an additional insert seat(s) associated with the second end edge.

As is understood from the prior art parting blade in FIG. 2, the non-indexable design would likely derive from the flexible connection 38 of the insert seat 26 located at the short edge of the parting blade. Noting that unlike FIG. 1, the cutting forces in FIG. 2 would more likely require a stopper positioned at the rear 47 of the blade, it was clearly preferred not to provide a damageable flexible connection for abutment against a stopper.

However, for the above aspects which do not comprise a flexible connection at such location, there is a further advantage that at least one insert seat can be located at both of the first and second end edges.

According to any of the above aspects, regardless of the insert seat type, a longitudinal edge associated with an insert seat can extend in an oblique direction such that it extends underneath the insert seat. Stated differently, an elongation direction of a parting blade can be non-orthogonal to a rake surface of a cutting insert.

It will be understood that in both the prior art blades in FIGS. 1 and 2, the longitudinal edge 44, 45, does not extend in an oblique elongation direction of the parting blade such that it extends underneath the insert seat. Similarly, the rake surfaces 48, 50 in both disclosures is either basically parallel or basically perpendicular with the elongation direction.

By providing such feature (hereinafter the "oblique parting blade construction"), the present invention, in theory, provides a more stable parting blade than is known in the prior art, since the cutting force applied to a parting blade is more directed along the length of the blade. While appreciating that different variables such as workpiece diameter varies cutting force direction, the most preferred oblique angle θ, fulfills the condition: $60°>θ>0°$, more preferably $50°>θ>10°$, and most preferably $40°>θ>20°$. Additionally, it is believed values are more beneficial as they tend to 30°. The oblique angle θ being measurable between a line perpendicular to the shank axis and the forwardmost obliquely extending longitudinal edge.

Even though such oblique parting blade construction can be advantageous with regard to the cutting force direction, the removal of material directly underneath a cutting insert, e.g. at the longitudinal edge side of an insert seat weakens the construction strength of the insert seat.

Accordingly, in addition to providing the oblique parting blade construction, said weakening can be countered by providing an orthogonal sub-edge adjacent the insert seat. To elaborate, an orthogonal sub-edge portion of a longitudinal edge associated with an insert seat can extend in a non-oblique direction (e.g. not extending obliquely under the insert seat or, stated differently, extending orthogonal to a rake surface), and a connected oblique sub-edge can extend from the orthogonal sub-edge towards an opposing end edge.

Such orthogonal sub-edge portion can provide two independent benefits. A first benefit of strengthening of the insert jaw associated with the longitudinal edge (i.e. allowing it to be thicker and/or to extend directly underneath the cutting insert and provide more support, and a second benefit that the insert seat is moved closer to the middle of the first or second end edge, thereby directing the cutting force even more centrally along the elongation direction of the parting blade.

Accordingly, in a fourth aspect of the present invention, there is provided an elongated parting blade having a basic elongation direction and comprising: opposing first and second side surfaces extending between first and second longitudinal edges and also extending between opposing first and second end edges which are shorter than and extend transverse to the first and second longitudinal edges; and an insert seat associated with the first longitudinal edge and the first end edge; the insert seat being recessed towards the second longitudinal edge.

Stated differently, the term "recessed towards the second longitudinal edge" could alternately be defined as distanced from an imaginary extension line of the first longitudinal edge in a direction towards the second longitudinal edge.

Regardless of the terminology used, it will be understood that such aspect provides the centralization of the cutting force as described above. It will also be understood that any of the features stated above with respect to the first, second and third aspects are also applicable to this aspect which defines a preferred location of an insert seat and not a specific insert seat construction.

In accordance with a fifth aspect of the present invention, there is provided an elongated parting blade having a basic elongation direction and comprising: opposing first and second side surfaces extending between first and second longitudinal edges and also extending between opposing first and second end edges which are shorter than the first and second longitudinal edges; the first and second longitudinal edges extending along the basic elongation direction; the parting blade further comprising an insert seat opening out to or proximate to the first end edge; the insert seat comprising a lower seat abutment surface and at least one additional abutment surface; and wherein, the first longitudinal edge comprises a proximate portion which is proximate to, and extends underneath, the lower seat abutment surface.

More precisely, the insert seat can open out to one of (a) the first end edge, (b) both the first end edge and first longitudinal edge, or (c) the first longitudinal edge at a portion thereof adjacent to the first end edge.

Preferably, the proximate portion extends underneath the entire insert seat.

Preferably, the proximate portion extends in both a rearward direction and a downward direction ($D_R$, $D_D$).

Preferably an oblique blade angle θ1, measurable between the downward direction $D_D$ and the proximate portion fulfills the condition: 60°>θ1>0°, more preferably 50°>θ1>10°, and most preferably 40°>θ1>20°. Additionally, it is believed values of the oblique blade angle θ1 are more beneficial as they tend to 30°.

The above mentioned at least one additional abutment surface can be either an abutment surface of an upper jaw (similar to the pocket type shown in FIG. 2, the upper jaw being designated as "36", and accordingly the at least one additional abutment opposes the lower seat abutment surface) or can be a rear seat abutment surface (similar to the pocket type shown in FIG. 5B, designated as "134B", and accordingly the at least one additional abutment is basically perpendicular to the lower seat abutment surface). The precise orientation of the additional abutment surface is not of importance, rather it will be understood that typically an insert needs to be secured by more than one abutment surface and the location of the lower seat abutment surface is being used to describe the relative orientation of the proximate portion. It will also be understood that the lower seat abutment surface can, and often will, be other than a flat surface but that it basically lies in a seat plane $P_S$ (see FIG. 16B). The seat plane being basically perpendicular to the first and second side surfaces and parallel with the forward and rearward directions ($D_F$, $D_R$).

The elongated parting blade can have a linear shape or a non-linear shape. For example, the elongated parting blade can be bent or curved. In embodiments where the parting blade comprises a bend, the bend can preferably be located at about the center of the length of the blade. Preferably, the bend can be exactly in the middle of the length of the blade, allowing the blade to be equally indexable about the middle thereof.

Such blade can have, for example, in a mounted position, a vertically extending clamping portion and an obliquely extending cutting portion (which portions can switch functions when indexed, if indexable). Accordingly, for example, the blade can be mounted in a relatively compact tool holder 64 as shown in FIG. 3, yet still have the advantageous oblique orientation provided in the cutting assemblies shown, for example, in FIGS. 6 and 7A. Additionally, such blade can be mounted in a standard tool holder 16 or 24 (e.g. shown in FIGS. 1 and 2) designed for a non-oblique blade.

It will be understood that such parting blade can even be mounted at different overhang lengths if desired. This being in addition to an advantageous force application.

Initial tests were made with a linear blade having an oblique angle of 15° (FIG. 7A) and −15° (not shown) as well as 0° (FIG. 3) with the stability being excellent at all angles. In recent tests a linear blade with an oblique orientation angle of 30° (in a configuration similar to the blade shown in FIG. 7A) was found to have superior results (performing approximately twice the number of slits to the aforementioned embodiments). A non-linear blade of the type shown in FIGS. 16A-16E and having an oblique orientation angle of 30° is expected to have similar benefits to the linear blade tested.

In accordance with a sixth aspect of the present invention, there is provided an elongated parting blade having a basic elongation direction and comprising: opposing first and second side surfaces extending between first and second longitudinal edges and also extending between opposing first and second end edges which are shorter than and extend transverse to the first and second longitudinal edges; and an insert seat associated with the first longitudinal edge and the first end edge; the first end edge further comprising a projecting portion which projects further in the basic elongation direction than the insert seat; the projecting portion comprising a blade outlet aperture directed towards the insert seat.

Even though the provision of the projecting portion decreases the above discussed chip evacuation space available, the advantageous provision of coolant is believed to outweigh this detriment in at least some cases.

In accordance with a seventh aspect of the present invention, there is provided a parting blade and sealing device for the parting blade, the parting blade comprising: opposing first and second side surfaces extending between and peripheral edges; and an insert seat; the parting blade further comprising an internal coolant arrangement comprising a blade inlet aperture out to both the first and second side surfaces, a blade outlet aperture opening out at or towards the insert seat, and a blade passageway extending from the blade inlet aperture to the blade outlet aperture; the sealing device comprising a sealing portion configured to seal the blade inlet aperture at the second side surface and an at least partially threaded shank portion which is longer than a blade thickness measured from the first to second side surface; the parting blade being devoid of a threaded hole configured for receipt of the threaded shank portion.

It will be understood that the shank portion is configured to extend through the blade and threadingly connect to a threaded hole of a tool holder holding the parting blade. Since the parting blade can be manufactured without a threaded hole for attaching the sealing device too, the manufacture of the blade is simplified (e.g. by providing a simple threadless hole); the parting blade can potentially be made thinner than a comparative blade with a threaded hole (since typically at least three thread rotations are needed for secure connection defining a minimum blade thickness).

Another advantage may be that it is theoretically possible to secure the blade inlet aperture with direct engagement to the tool holder thereby possibly allowing high pressure coolant transfer without the need for a sealing ring and associated construction between the parting blade and tool holder.

Accordingly, it is believed theoretically possible to provide a parting blade having a blade thickness of 2.2 mm or less, preferably 2.0 mm or less and most preferably between 1.7 mm to 1.9 mm, inclusive. Said thickness refers to the thickness of the entire blade (it will be understood that parting blades exist which have a very small thickness near an insert seat and an enlarged spaced apart from the insert seat).

The present aspect can be applied to elongated parting blades, particularly having a basic elongation direction, first and second longitudinal edges and opposing first and second end edges which are shorter than and extend transverse to the first and second longitudinal edges, an insert seat being associated with the first longitudinal edge and the first end edge.

Additionally, unlike some of the other aspects of the present application, the advantage of a parting blade devoid of threaded holes between the opposing first and second side surfaces thereof is advantageous even to parting blades which are not elongated (for example parting blades of the type disclosed in WO2018/047162, there called "adaptors", said patent application being assigned to the present applicant and the contents of which are incorporated by reference herein).

It will be appreciated that the benefit of a parting blade devoid of a threaded hole, allowing a very small blade thickness is not related to the shape of the parting blade.

In summary, the features of the seventh aspect can also be applied to a non-elongated blade, for example a non-elongated parting blade with one or more insert seats.

It will be noted that the first, second, third and fourth aspects are directed to construction associated with the insert seat, the fifth aspect with the blade shape, and the sixth and seventh aspects are directed to coolant construction features. Accordingly, it will be understood that either the sixth and seventh can be combined with any of the non-related features of the first to fifth aspects to provide an even further advantageous parting blade. It will also be understood that a parting blade according to any of the first four aspects, can be devoid of a coolant construction, if desired.

Additional to what is stated in the discussion of the threaded hole aspect (sixth aspect), a parting blade may be able to be made thinner than known comparative blades due to the extra stability provided by the orientation of the cutting insert directing the cutting force longitudinally into the blade.

Accordingly, according to any of the above aspects, a parting blade can have a blade thickness of 2.2 mm or less. Said blade thickness can be in accordance with the values defined above.

As will be discussed below with respect to the tool holder, a preferred tool holder for any of the aspects can hold a parting blade in a single position, i.e. without the possibility of changing the overhang length thereof as exemplified in the prior art parting blades in FIGS. 1 and 2. In embodiments where such feature is taken into account, according to any of the above aspects, a ratio of a maximum blade length $L_B$ and shank length $L_S$, both of which being measured parallel to an elongation direction, can fulfill the condition $L_S/L_B<0.45$, preferably $L_S/L_B<0.40$ and most preferably $L_S/L_B<0.35$. The shank length $L_S$ being the shortest distance measurable from a second end edge to a blade inlet aperture configured for an insert seat located at the first end edge.

It will be understood that if the maximum blade length $L_B$ is theoretically divided into a shank length $L_S$ (for mounting to a tool holder) and the remainder being an overhang length $L_O$, the combination of the insert seat constructions detailed above and the cutting tool assembly not being configured for different overhangs (as will be described below) allow a much shorter shank length $L_S$ than was previously used for parting blades. In theory, the shank length $L_S$ can even be as short as approximately the same length as a blade width $W_B$.

According to an eighth aspect of the present invention, there is provided a tool holder comprising: a tool shank having a shank axis defining forward and rearward directions; and a tool head connected to the tool shank; the tool shank comprising opposing uppermost and lowermost shank surfaces which define upward and downward directions perpendicular to the shank axis, and further comprising first and second shank side surfaces which define first and second side directions perpendicular to the shank axis and the upward and downward directions; the tool head extending in the forward and downward directions from a front shank portion of the tool shank and comprising a blade pocket; the blade pocket comprising a peripheral wall formed with a pocket opening which opens out in the upward direction.

Without being bound to the details in the previous paragraph, the general concept of the present invention is to provide a tool holder having a traditional ("horizontal") shank orientation similar to that shown in FIG. 1 and a non-traditional ("vertical" or "basically vertical") parting blade orientation similar to that shown in FIG. 2, thereby allowing the tool holder to be mounted to turrets in traditional machines (typically lacking vertical movement capability) while providing the stability benefits of the design in FIG. 2. Current testing has shown that the present invention provides even better stability than the prior art designs. As the above-mentioned traditional machines lack vertical movement capability, according to preferred embodiments the tool holder is configured to hold a parting blade in a single position (i.e. without the possibility of changing the overhang length, such capability being available in the prior art tool holders in FIGS. 1 and 2. While such capability has always been one of the key features of a parting blade cutting tool assembly, it is believed that the trade off of providing superior stability outweighs such disadvantage. Stated differently, the tool holder and tool assembly aspects of the present invention are not restricted to the insert seat constructions or coolant constructions detailed in the previous aspects, although may clearly be advantageous if used in conjunction therewith.

It has also been subsequently found that even with machines with vertical movement capability, the present invention is advantageous since typically the vertical movement capability is configured for lighter or weaker machining.

The blade pocket is configured to hold a parting blade. The blade pocket can be located in the middle of the tool head (e.g. inside a groove, not shown). Preferably, however, the blade pocket is located at a side surface of the tool head.

The peripheral wall can comprise two side wall portions extending from the pocket opening. The side wall portions can extend in the downward direction. According to a preferred embodiment, the sidewall portions can extend in the downward and rearward directions from the pocket opening. Without being bound to theory, it is believed that the downward and rearward orientation (e.g. FIG. 6) is advantageous over the only downward (90°) orientation (FIG. 3), in that vibration of the parting blade during machining is less likely to result in the unclamped part of the parting blade swinging away from the workpiece due to cutting forces and returning in a pendulum manner to impact it (it will be understood that such motion is extremely small). It is further believed that the oblique parting blade construction is superior, as explained above. Nonetheless, FIG. 3 certainly constitutes one possible embodiment of the present invention. It will be noted that any basic upward inclination of the parting blade would provide the basic advantage of the present invention, even if the parting blade would be slanted rearwardly (not shown), instead of vertically in FIG. 3 and forwardly in FIG. 6. Nonetheless, a rearward slant would require the tool head to have a more bulky construction in the forward direction than a vertical slant, and a vertical slant more than a forward slant. As shown in FIG. 6 the forward slant allows the tool head to have a compact shape near a lowermost point thereof (i.e. the material shown in dashed lines is not needed whereas it is present in FIG. 3.

The peripheral wall can comprise a stopper wall portion. The stopper wall portion is for providing the parting blade with a fixed height relative (i.e. single position). The stopper portion is preferably located opposite the pocket opening. The stopper wall portion is preferably straight. The stopper wall can be connected to one or both of the side wall portions.

The tool holder can comprise a clamp configured to hold a parting blade to the blade pocket. The clamp can be located adjacent to one of the side wall portions. Such arrangement can provide the strong peripheral clamping arrangement of the prior art.

According to one preferred embodiment, the clamp is located adjacent the side wall portion closest to the tool shank. This allows the other side wall portion (i.e. the forwardmost side wall portion) to be relatively smaller, allowing the benefits of the compact design of the tool head. It is noted that this is the opposite arrangement to known prior art cutting assemblies, which are known to have a cutting insert at the same side of a blade which is held with a moveable clamp This is the traditional design because the cutting forces are primarily directed to the side of the blade held with a static (and hence more stable) component. However for the present invention, where there is an interest to reduce the size of the tool holder at the front end thereof and the cutting forces are more longitudinally directed than in the traditional blade arrangements (e.g. as shown in FIG. 1), it is believed that this is preferred.

According to a different embodiment, the peripheral wall can comprise a single side wall portion extending from the pocket opening, and a clamp can form a second side wall portion opposite the first side wall portion. In such case the clamp can be integral to the tool holder with one or more flexible connections (allowing compact construction) or a separate component (allowing ease of manufacture, similar to the clamp 54 shown in FIG. 1). In such embodiment, the preferred compact tool head design may be outweighed by a preference for clamping access at the front of the tool holder.

The side wall portions can longer than the stopper wall portion. Stated differently, the blade pocket can have an elongated shape. It will be understood that the longer the blade pocket, the more stable the clamping. According to the rule of thumb of the prior art tool holders, an overhang of a parting blade is typically about ⅓ of the overall length of the parting blade, with the remainder being required to be clamped. However a longer blade pocket also necessitates a larger tool head. Accordingly, it is preferred to minimize the length of the blade pocket to provide sufficiently strong clamping while reducing the tool head size.

Preferably a side wall portion length $L_{SW}$ (measured from the pocket opening to a stopper wall portion) and a stopper length $L_{ST}$ (measurable between two side wall portions subtracting the space taken by a clamp, if present; stated differently, equivalent to the blade width $W_B$) fulfill the condition $L_{SW}<3L_{ST}$, preferably $L_{SW}<2L_{ST}$, most preferably $L_{SW}<1.5L_{ST}$. In theory it is preferred that $L_{SW}\geq L_{ST}$.

Accordingly, the number of screws used for a clamping mechanism could be less than the traditional three or four.

The side wall portions are preferably tapered to provide a similar clamping construction to that seen in FIG. 1. Similarly, the longitudinal edges of a parting blade can be correspondingly tapered. It is noted that since the present tool holder does not provide overhang adjustment, it is not strictly necessary for the longitudinal edges to be parallel or parallel along their entire length. Nonetheless clamping the longitudinal edges, and more preferably tapered longitudinal edges, is still believed to provide the most advantageous clamping arrangement, even though other arrangements could be theoretically possible (e.g. screw holes formed in the blade and pocket face, or more preferably screw holes combined with tapered side edges. Even though a parting blade free of such screw holes is still the most preferred configuration.

According to an embodiment, a pocket face comprises a threaded hole. The threaded hole can be adjacent a tool holder coolant outlet aperture. In such case the tool holder could be configured for high pressure coolant (e.g., greater than 20 bar, or preferably greater than 60 bar). The pocket face could, theoretically, be devoid of a sealing element (e.g., an o-ring) between the blade pocket and parting blade.

The tool holder can be preferably configured to hold the parting blade in a single position (i.e. only providing a single overhang length). Nonetheless, it is envisaged that a fine-tuning component could be used for fine-tuning of the position of the parting blade. For example, such component can be located adjacent the stopper wall portion.

According to an embodiment, a sealing hole can be formed in the parting blade. The sealing hole can be configured to receive a shank of a sealing device therethrough. The sealing can be elongated in the elongation direction. A sealing hole can be significantly larger than a pocket face hole configured to receive a shank of a sealing device extending through the sealing hole. Such construction can facilitate said fine-tuning. Alternatively, such construction can ease production of the blade and/or tool holder by reducing tolerance requirements and/or allow for fine-tuning of the position of the blade.

While the tool shank exemplified in the drawings is basically square in cross section, it will be understood that such shanks can be other shapes such as circular in cross section (i.e. cylindrical). For a cylindrical shank, for example, the uppermost and lowermost shank surfaces, and first and second shank side surfaces can be thin line portions, parallel to the shank axis, at the defined extremity positions. Unique advantages of a tapered shank construction have been found, as detailed below.

According to a ninth aspect of the present invention, there is provided a tool holder comprising: a tool shank having a shank axis defining forward and rearward directions; and a tool head connected to the tool shank and comprising an insert seat or a blade pocket; the tool shank comprising opposing uppermost and lowermost shank surfaces which define upward and downward directions perpendicular to the shank axis; first and second shank side surfaces which define first and second side directions perpendicular to the shank axis and the upward and downward directions; wherein adjacent to at least a portion of the first shank side surface there is a reinforcement portion connecting the first shank side surface and the tool head.

The reinforcement portion can provide additional structural strength to support the tool head. It will be understood that there are extremely high cutting forces in the long overhang application subject the present subject matter, and the reinforcement portion assists to reduce bending forces on a tool head.

After development of the tool holder for a parting blade, it was found that the reinforcement portion also improves performance of other cutting tool types.

When the tool shank is mounted to a turret recess, the reinforcement portion is configured to extend outside of the recess and alongside the turret.

Preferably, the reinforcement portion extends further in the downward direction than the lowermost shank surface. In such embodiments, it is preferred that the reinforcement portion can comprise a relief portion directly adjacent the lowermost surface. In configurations where it is desired that the reinforcement portion abut a turret side surface, the relief portion only extends a limited distance in the downward direction and further downward therefrom the reinforcement portion increases in thickness towards the second side direction (i.e. generally towards the tool shank). Stated differently, the relief portion can provide a neck shape to the reinforcement portion According to one embodiment, a shank width of the tool shank can be configured such that the second shank side surface does not contact the turret recess and the reinforcement portion abuts a turret side surface. Preferably, in such embodiment there is the aforementioned relief portion.

However it will be understood that while such abutment may help somewhat with stability, the primary benefit of the reinforcement portion is not believed to be derived from such abutment. Rather the additional structural support between the tool head and tool shank. Accordingly, it will be understood that the second shank side surface can be configured to contact the turret recess and the reinforcement portion can be configured to be spaced from the turret.

Preferably, the reinforcement portion has a blade shape. To elaborate, a reinforcement portion width $H_W$ measured parallel to the first and second side directions can be the smallest dimension of the reinforcement portion. Such configuration provides two benefits, firstly the moment or bending forces are most efficiently countered with such orientation of the blade shape, secondly there is a minimal projection of the reinforcement portion from the turret.

While the reinforcement portion can be uniform in cross section and extend from the tool head to a shank end, it will be understood that the most critical area for support is adjacent to the tool head. Accordingly, preferably the reinforcement portion can extend from the tool head until only a central portion of the tool shank (i.e. not until a shank rear end, although that is certainly one option). While this is optional, it provides the benefit of reduction of material required for the tool head. Similarly, a reinforcement portion height dimension (measured parallel to the upward and downward directions) can be greatest adjacent the tool head and can have a reduced height dimension at a larger distance therefrom. The reinforcement portion can have a tapering height with increasing distance from the tool head.

Preferably, the reinforcement portion can lie in the same plane as a blade pocket. Stated differently, for parting and grooving applications it is optimal for the reinforcement portion to be in the same plane as the cutting insert.

Preferably, the reinforcement portion can be formed with a portion of an insert seat or blade pocket. Said portion can be a sidewall extending from a pocket surface.

Preferably the height dimension proximate to the tool head is at least half the height of the tool shank. More preferably at least equal to the height of the tool shank. In terms of the reinforcement portion height $H_R$, this means that proximate to the tool head the reinforcement portion height $H_R$ is equal to at least one and a half times the tool shank height $H_S$ ($H_R \geq 1.5 H_S$) and preferably $H_R \geq 2 H_S$.

A concave surface of the tool holder can extend from the front of tool shank to the front uppermost point of the tool head. The front concave surface can define a tool overhang length from the pocket opening to a height of the uppermost surface of the shank portion, when measured perpendicular to a pocket elongation direction.

It will be understood, similar to the previous aspect, that while the tool shank exemplified in the drawings is basically square in cross section, such shanks can be other shapes such as circular in cross section (i.e. cylindrical).

It will be understood that any of the features mentioned in connection with the previous aspect can be incorporated into the present aspect.

According to a tenth aspect of the present invention, there is provided a tool holder comprising: a tool shank having a shank axis defining forward and rearward directions; and a tool head connected to and extending forward of the tool shank; the tool shank comprising opposing uppermost and lowermost shank surfaces which define upward and downward directions perpendicular to the shank axis; first and second shank side surfaces which define first and second side directions perpendicular to the shank axis and the upward and downward directions; wherein the tool holder further comprises an insert seat or a blade pocket which is partially formed on the tool head and extends rearward of the tool head.

Stated differently, a tool holder having a shank portion to be held by a turret or machine and a tool head to provide support, proximate to a workpiece, to a parting blade or cutting insert machining the workpiece, in combination with the parting blade or cutting insert being sized so that it extends rearward of the tool head provides a compact tool assembly with hitherto unknown relatively large depth of cut.

According to an eleventh aspect of the present invention, there is provided a tool holder comprising a blade pocket which in turn comprises a pocket surface and one or more sidewalls; wherein the tool holder further comprising a resilient biasing element located along the pocket surface and is configured to provide a biasing force towards one of the tool abutment surfaces or an area to which two tool abutment surfaces converge.

According to a twelfth aspect of the present invention, there is provided a rotationally symmetric parting blade comprising opposite first and second side surfaces; a peripheral edge connecting the first and second side surfaces; and a plurality of circumferentially spaced insert seats formed along the peripheral edge; wherein each insert seat has only a single blade coolant passageway associated therewith; each coolant passageway extending from a blade inlet aperture proximate the center of the parting blade but offset therefrom to a blade outlet aperture opening out at or towards the insert seat.

Preferably the blade outlet aperture is configured to be directed above a rake surface of a cutting insert held by the associated insert seat.

According to a thirteenth aspect of the present invention, there is provided a cutting tool assembly comprising a tool holder, parting blade and a cutting insert; the tool holder comprising a pocket surface with at least one hole extending therein; the parting blade comprising at least one insert seat and at least one hole proximate to the insert seat and configured to eject or mount the insert to the insert seat; wherein, when the parting blade is mounted to the tool holder, a fastener extends through the at least one hole in the parting blade and enters the at least one hole in the pocket surface to assist in securing the parting blade to the tool holder.

Preferably the holes formed in the pocket surface are threaded and the fastener is a screw with a corresponding threading.

Preferably the at least one hole formed in the parting blade is devoid of threading.

According to one preferred embodiment the parting blade comprises at least one additional hole which is not configured for ejection or mounting of an insert seat, and the parting blade is secured to the tool holder with a fastener extending through said at least one additional hole and at least one other fastener extending through said at least one hole configured to eject or mount the insert to the insert seat.

According to a fourteenth aspect of the present invention, there is provided a tool assembly comprising: a tool holder and either a parting blade or a cutting insert; wherein the tool holder comprises a tool shank having a shank axis defining forward and rearward directions and a constant cross sectional shape perpendicular to the shank axis; and a tool head connected to and extending forward of the tool shank and comprising different cross section to the shank portion; wherein an insert seat or blade pocket is at least partially formed on the tool head; wherein when the parting blade or cutting insert is mounted to the insert seat or blade pocket at least a portion of the parting blade or cutting insert extends rearward of the tool head.

According to a fifteenth aspect of the present invention, there is provided a tool assembly comprising: a tool holder and either a parting blade or a cutting insert; wherein the tool holder comprises a tool shank having a shank axis defining forward and rearward directions; a tool head connected to and extending forward of the tool shank and comprising a rearwardly facing tool head rear surface; and a pocket at least partially formed on the tool head and configured to hold the parting blade or cutting insert; wherein, when the parting blade or cutting insert is mounted to the pocket it extends rearward of the tool head rear surface.

According to a sixteenth aspect of the present invention, there is provided a cutting tool assembly comprising a tool holder and parting blade according to any of the previous aspects.

It will be understood that the following features are applicable to all of the aspects.

The cutting tool assembly can further comprise a cutting insert. The cutting insert can comprise a cutting edge which is wider than the entire parting blade.

The tool holder can be configured to hold a parting blade only along a periphery thereof together with abutment of a pocket surface.

The parting blade's body can be a unitary one-piece construction (i.e. the term "body" excluding cutting inserts and sealing devices).

Preferably the tool holder (i.e. shank portion and tool head) can be a unitary one-piece construction. Stated differently, the tool head is preferably integrally connected to the shank portion. It will be understood that it is feasible to secure two different such components together, e.g. with screws, however such construction is typically weaker or less compact and thus there is a large preference for said unitary one-piece construction.

The parting blade can be symmetrical about a bisecting plane extending parallel with and equally spaced from the first and second side surfaces.

The parting blade can have 180 degrees rotational symmetry about a blade axis that extends through the center of, and in a direction perpendicular to, the first and second side surfaces.

The parting blade can have mirror symmetry about a lateral plane extending perpendicular to the first and second side surfaces and located midway between the opposing first and second end edges. Such construction can result in a double-ended parting blade which is not rotationally symmetric about a blade axis that extends through the center of, and in a direction perpendicular to, the first and second side surfaces.

The parting blade's first and second side surfaces can be planar. Notably, a planar shaped parting blade is significantly cheaper to produce than a component with a laterally extending portion.

Abutment portions of a tool holder to a turret can be: either a surface of the reinforcement portion or a side surface of a tool shank, lower and upper surfaces of a tool shank and a rear surface of a tool head. It will be noted that it is not essential for the tool head to contact the turret, but it may provide better stability.

Abutment portions of a parting blade to a blade pocket can be: one of the first and second side surfaces, both the first and second longitudinal edges, and preferably but optionally, one of the first and second end edges.

To remove any doubt, any of the features above which have been mentioned with respect to one aspect, but the benefit explained is clearly applicable to another aspect is combinable with the other aspect.

For example, any of the above aspects can include the reinforcement portion feature and any features relating thereto.

Similarly, all the parting blades are believed to be held in an extremely stable manner. Therefore, details above of such parting blades being preferred to be less than a certain thickness (e.g. less than 2.2 mm or 2 mm) are applicable to all parting blades.

Likewise, all tool holder according to the present invention can comprise a blade pocket which in turn comprises a pocket surface and one or more sidewalls.

BRIEF DESCRIPTION OF THE DRAWINGS

For a better understanding of the subject matter of the present application, and to show how the same may be carried out in practice, reference will now be made to the accompanying drawings, in which:

FIG. 1 is a schematic side view of a prior art cutting tool assembly and workpiece;

FIG. 2 is a schematic side view of a prior art parting blade in a similar tool holder to that shown in FIG. 1 and a workpiece;

FIG. 3 is a schematic side view of a cutting tool assembly according to the present invention and portion of a workpiece;

FIG. 3A is a schematic side view of another parting blade according to the present invention;

FIG. 5A is a perspective view of a parting blade of the cutting tool assembly in FIG. 4A;

FIG. 5B is a side view of the parting blade in FIG. 5A, showing internal coolant channels in dashed lines;

FIG. 5C is a rear view of the parting blade in FIG. 5B;

FIG. 5D is a front view of the parting blade in FIG. 5B;

FIG. 5E is top view of the parting blade in FIG. 5B;

FIG. 13A is a side perspective view of another cutting tool assembly according to the present invention;

FIG. 13B is another side perspective view, exploded, of the cutting tool assembly in FIG. 13A;

FIG. 13C is a side view of the cutting tool assembly in FIG. 13A;

FIG. 13D is a bottom view of the cutting tool assembly in FIG. 13A;

FIG. 13E is a top view of the cutting tool assembly in FIG. 13A;

FIG. 14A is a side perspective view of another cutting tool assembly according to the present invention;

FIG. 14B is another side perspective view of the cutting tool assembly in FIG. 14A, also showing an exemplary option shown with hatching;

FIG. 14C is a side view of the cutting tool assembly in FIG. 14A;

FIG. 14D is a rear view of the cutting tool assembly in FIG. 14A;

FIG. 14E is a front view of the cutting tool assembly in FIG. 14A;

FIG. 14F is a bottom view of the cutting tool assembly in FIG. 14A;

FIG. 14G is a top view of the cutting tool assembly in FIG. 14A, also showing the exemplary option shown in FIG. 14B with hatching;

FIG. 15A is a side perspective view of another cutting tool assembly according to the present invention;

FIG. 15B is another side perspective view of the cutting tool assembly in FIG. 15A;

FIG. 15C is a side view of the cutting tool assembly in FIG. 15A;

FIG. 15D is a rear view of the cutting tool assembly in FIG. 15A;

FIG. 15E is a front view of the cutting tool assembly in FIG. 15A;

FIG. 15F is a bottom view of the cutting tool assembly in FIG. 15A;

FIG. 15G is a top view of the cutting tool assembly in FIG. 15A;

FIG. 16A is a perspective view of a parting blade according to the present invention;

FIG. 16B is a side view of the parting blade in FIG. 16A;

FIG. 16C is a rear view of the parting blade in FIG. 16B;

FIG. 16D is a front view of the parting blade in FIG. 16B;

FIG. 16E is top view of the parting blade in FIG. 16B;

DETAILED DESCRIPTION

Figure 4A:
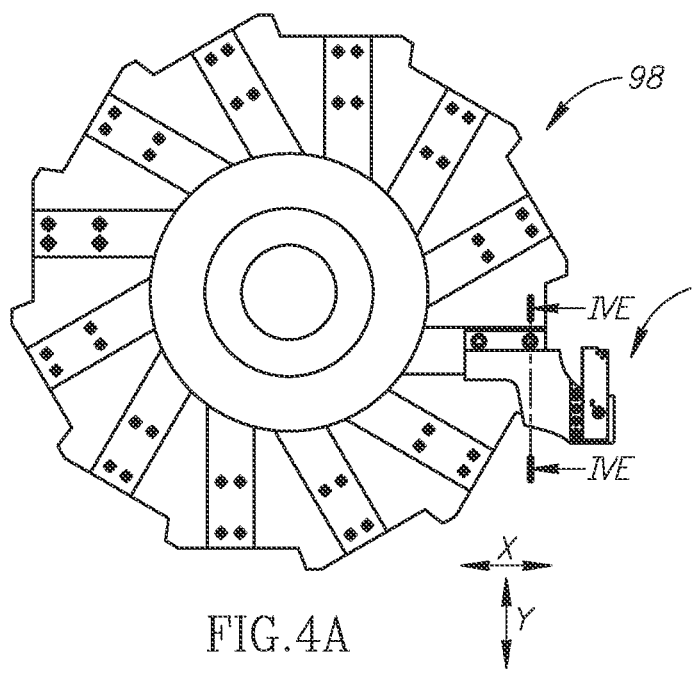
FIG. 4A is a side view of the cutting tool assembly in FIG. 3 mounted to a turret.
Figure 4C:
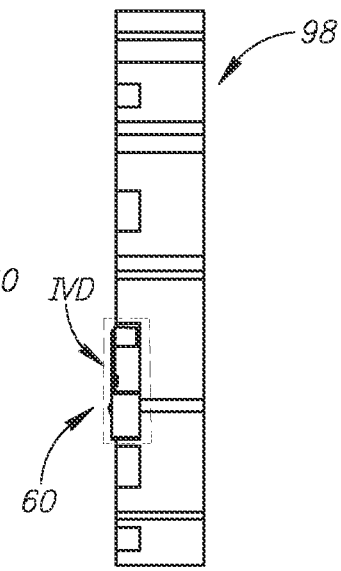
FIG. 4C is a front view of the cutting tool assembly and turret in FIG. 4A.
Figure 4B:
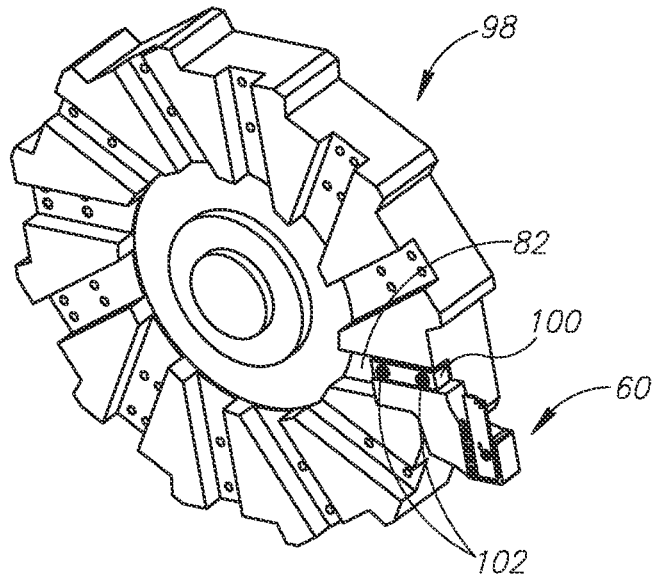
FIG. 4B is a perspective view of the cutting tool assembly and turret in FIG. 4A.

Reference is made to FIG. 3, which illustrates a cutting tool assembly 60 configured for parting a metal workpiece 62, and which will be described generally for basic understanding of the overall concept of a parting blade in accordance with the invention.

The cutting tool assembly 60 comprises a tool holder 64 and a parting blade 66 mounted to the tool holder 64 and configured to hold a single cutting insert 68.

Figures 4D, 4E:
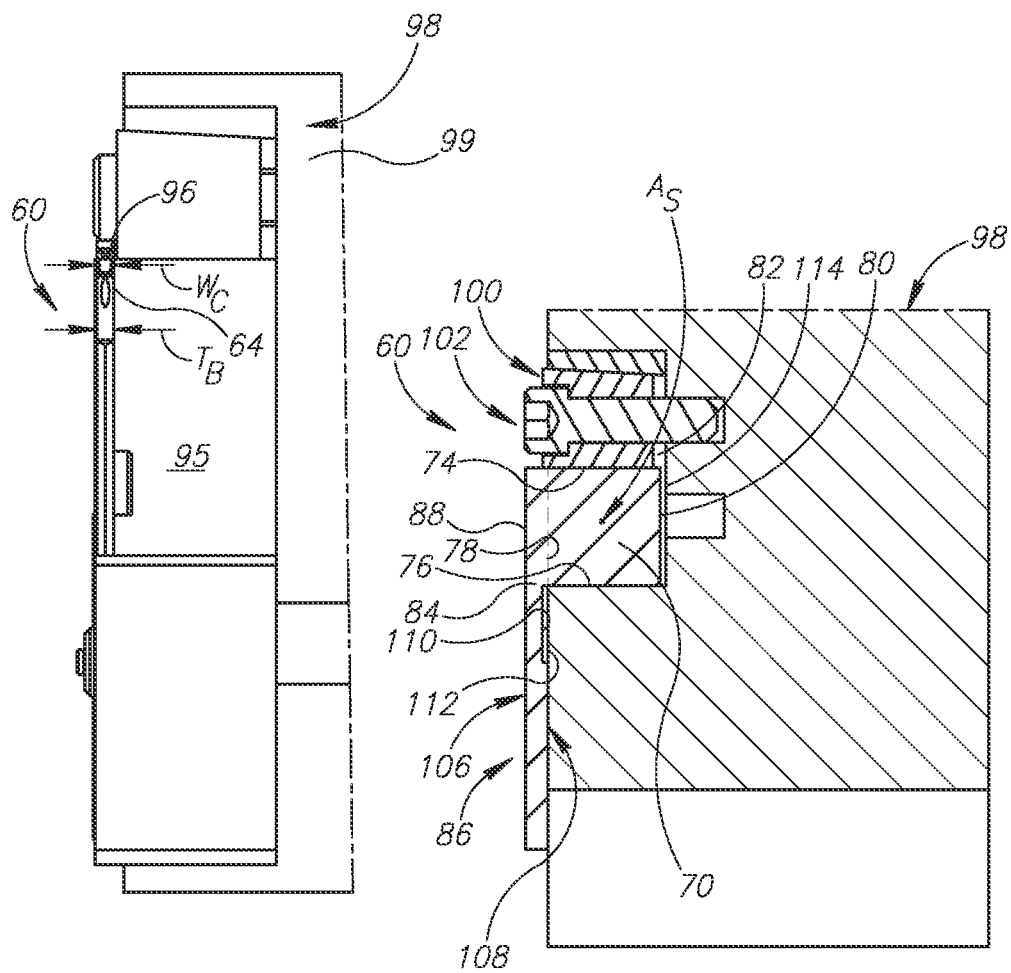
FIG. 4D is an enlarged front view of the portion marked "IVD" in FIG. 4C.
FIG. 4E is a cross section view taken along line IVE-IVE in FIG. 4A.

Referring also to FIG. 4E, the tool holder 64 comprises a tool shank 70 having a shank axis As (FIG. 3) defining forward and rearward directions $D_F$, $D_R$ (FIG. 3).

The tool shank 70 comprises opposing uppermost and lowermost shank surfaces 74, 76 which define upward and downward directions $D_U$, $D_D$, and further comprises first and second shank side surfaces 78, 80 which define first and second side directions $D_{S1}$, $D_{S2}$. It will be understood that the first shank side surface 78 is considered to be within a turret recess 82 and an extension of material 84 in the first side direction $D_{S1}$ is considered part of a reinforcement portion 86. However, for the purposes of definition of the first and second side directions $D_{S1}$, $DS_2$, an outer surface 88 of the reinforcement portion 86 can be used.

The tool holder 64 further comprises a tool head 90 which comprises a blade pocket 92 to which the parting blade 66 is clamped via a clamp 94. The tool head 90 can also typically comprise a concave front surface 95 to provide space for the workpiece 62.

Notably, the reinforcement portion 86 connects the tool head 90 and tool shank 70 to increase rigidity therebetween.

The exemplary parting blade 66 in FIG. 3A, for example, has a longitudinal axis L which, similar to the previously described example in FIG. 3, extends along a basic elongation direction $D_E$ of the parting blade 66. In this embodiment (FIG. 3), the basic elongation direction $D_E$ is perpendicular to the shank axis As. The basic elongation direction $D_E$ is also perpendicular to a rake surface 72 of the cutting insert 68.

The uppermost shank surface 60 is aligned with a cutting edge 96 and a center of a workpiece C.

Referring to FIG. 4A, standard machines only typically can move a turret 98 along an X-direction shown (which is parallel with the shank axis As), and not along a Y-direction shown. Thus, the overhang or height of the cutting tool assembly 60 (or others shown hereinafter) cannot be varied (at least for said standard machines to which the present invention has the most benefit). In other words, the cutting tool assembly 60 is configured for the parting blade 66 to be mounted in a single position only. It will be noted though, that the present invention can, in any case, be used on machines with both X and Y direction movement capability. Nonetheless, such construction allows machining with a parting blade 66 having the orientation shown, with a standard machine having limited axes.

Referring to FIGS. 4A to 4E, the cutting tool assembly 60 can be mounted to a turret 98. More precisely, the tool shank 70 is clamped to the turret recess 82 with a turret clamp 100. The turret clamp 100 has a tapering shape and two turret clamp screws 102 create a downward wedging force on the tool shank 70.

As shown in FIG. 4E, the reinforcement portion 86 extends outside of the turret recess 82 (i.e. in the first side direction $D_{S1}$) and also extends in the downward direction $D_D$ therefrom.

In FIG. 3 it can be seen that the reinforcement portion 86 reduces in size with proximity to a shank rear end 104.

The reinforcement portion comprises opposite first and second reinforcement portion sides 106, 108. Between the tool shank 70 and the second reinforcement portion side 108 there is formed a relief portion 110 which spaces a portion of the reinforcement portion side 108 adjacent to the lowermost surface 76 from a turret side surface 112.

A shank width is sized such that the second shank side surface 80 does not contact an inner wall 114 of the turret recess 82. Thus, in the present embodiment the second reinforcement portion side 108 contacts the turret side surface 112. However, it is feasible to design the opposite arrangement, i.e. that the second shank side surface 80 contacts the inner wall 114.

As best shown in FIG. 4D, the cutting edge 96 has a cutting edge width $W_C$ wider than a parting blade thickness $T_B$, which in this non-limiting example is the width of the entire parting blade 66.

While FIG. 3 is a simple example, it can be understood from FIG. 3A that a parting blade 116 of a similar construction can have four insert seats 118A, 118B, 118C, 118D.

Referring to FIGS. 5A to 5E a parting blade 120 will be described in more detail.

The parting blade 120 comprises first and second side surfaces 122A, 122B, first and second longitudinal edges 124A, 124B, opposing first and second end edges 126A, 126B.

As shown in FIGS. 5A and 5E the first and second longitudinal edges 124A, 124B have a tapered shape.

In this example the basic elongation direction $D_E$ is parallel with the first and second longitudinal edges.

First and second insert seats 128A, 128B are associated with the first longitudinal edge 124A and the first end edge 126A, and the second longitudinal edge 124B and the first end edge 126A, respectively.

Since the insert seats are identical only the first insert seat 128A will be described in detail.

The first insert seat 128A comprises first and second insert jaws 130A, 130B which form an insert-receiving gap 132 at a location where they oppose each other. The insert-receiving gap 132 is shown to open out in a direction towards the first end edge 126A, which in this example corresponds to the direction designated $D_G$. The insert receiving gap 132 has a gap axis $G_A$ which passes midway between the first and second insert jaws 130A, 130B, and intersects an imaginary plane $P_E$ defined by first end edge 126A.

The first insert seat 128A is further configured with a lower seat abutment surface 134A formed at a first longitudinal edge extremity of the first longitudinal edge 124A, and a rear seat abutment surface 134B formed by a first end edge extremity of the first end edge 126A. As best seen in the side view of FIG. 5D, the gap axis $G_A$ is parallel to the rear seat abutment surface 134B. Also, in the embodiment seen in FIGS. 5A-5E, the gap axis $G_A$ is substantially parallel to the longitudinal axis L. It is noted that the first insert seat 128A comprises a further abutment surface 134C parallel with the rear seat abutment surface 134B. Advantageously, the lower seat abutment surface 134A and a rear seat abutment surface 134B can both be formed with tapered shapes and the further abutment surface 134C can be devoid of a tapered shape.

The parting blade 120 can further, preferably, comprise an internal coolant construction. Referring to the identical coolant construction for the second insert seat 128B for ease of visibility, the coolant construction can comprise a blade inlet aperture 136, a first blade outlet aperture 138 located at a projecting portion 140 and a first blade passageway 142 extending therebetween. The coolant construction can further comprise a second blade outlet aperture 144 located at the second longitudinal edge 124B and a second blade passageway 146 extending from the blade inlet aperture 136 to the second blade outlet aperture 144. Notably, a single blade inlet aperture 136 can provide coolant to both the first and second outlet apertures 138, 144.

The coolant construction can provide a sealing hole 148 associated with the blade inlet aperture 136, such that a sealing device 150 (FIG. 7B) can seal the blade inlet aperture 136.

A blade thickness dimension $T_B$ is the smallest dimension of the parting blade 120.

A blade width dimension $W_B$ is larger than the blade thickness dimension $T_B$.

A blade longitudinal dimension (also called maximum blade length) $L_B$ is the largest dimension of the parting blade 120.

A shank length $L_S$ is shown.

Figure 6:
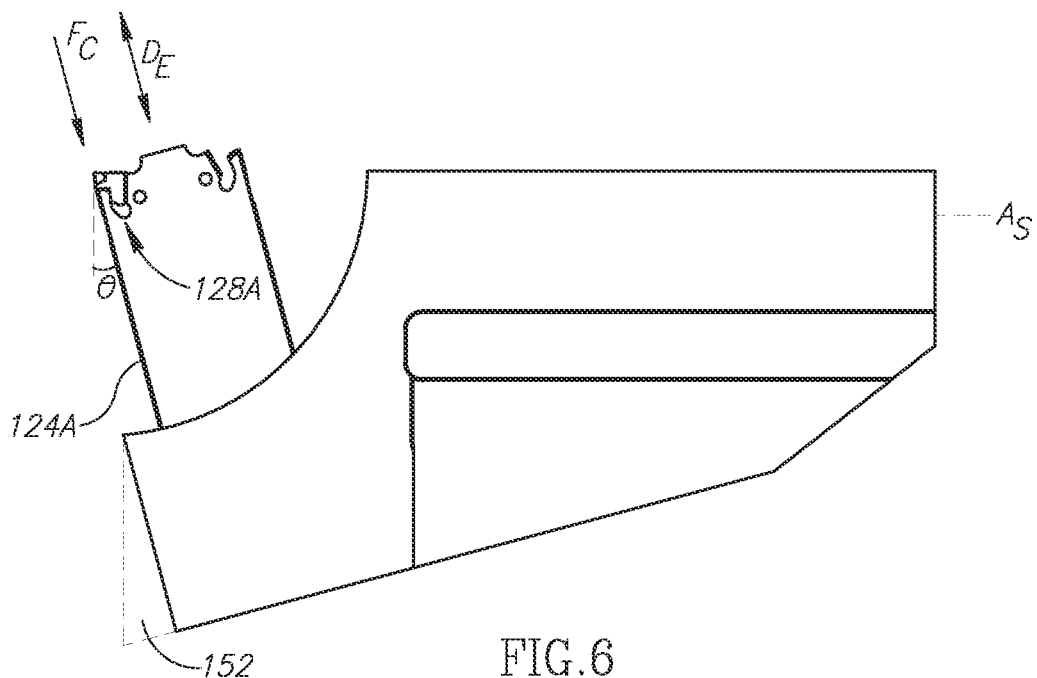
FIG. 6 is a side view of another cutting tool assembly according to the present invention.

Referring to FIG. 6, an example oblique parting blade construction will not be detailed. The general construction of which is similar to the previously embodiments, except that a longitudinal edge 124A extends underneath the insert seat 128A. It will be understood that a cutting force $F_C$ does not extend perpendicular to the shank axis As but rather is generally oblique (although varying due to different factors). As also mentioned above a tool head 90 can be made more compactly with such oblique construction. For example material can be removed from the area designated "152".

Thus the embodiment in FIG. 6 is thought to be advantageous over the perpendicular parting blade arrangement in FIG. 3. Preferences for the oblique angleθ are detailed above.

Figure 7A:
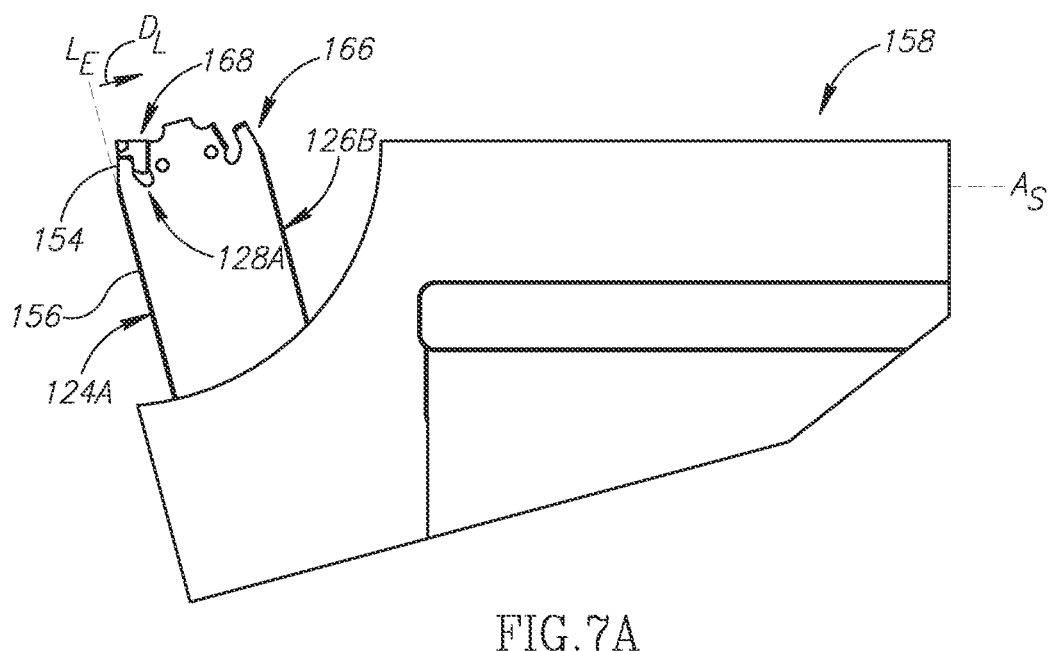
FIG. 7A is a side view of yet another cutting tool assembly according to the present invention.

FIG. 7A provides a parting blade 166 almost identical construction except that an orthogonal sub-edge 154 (i.e. basically orthogonal with respect to the shank axis $A_S$) is provided directly underneath a cutting insert 168. An oblique sub-edge 156 similar to that shown in FIG. 6 can extend from the orthogonal sub-edge 154. In the embodiment seen in FIGS. 8A-8D, the parting blade 166, the gap axis $G_A$ is again substantially parallel to the rear seat abutment surface 134B. However, in this embodiment, the gap axis $G_A$ forms an acute angle β with respect to the longitudinal axis L.

In such example the insert seat 128A is recessed towards the second longitudinal edge 124B. Which could also be described as the insert seat 128A being spaced apart from an imaginary extension line LE of the first longitudinal edge in a direction DL towards the second longitudinal edge 124B.

The cutting tool assembly 158 shown in FIGS. 7A to 11E will now be described.

The cutting tool assembly 158 is generally similar to that shown in FIG. 3, except that an oblique parting blade construction, described above in connection to a parting blade, is provided.

Figure 7B:
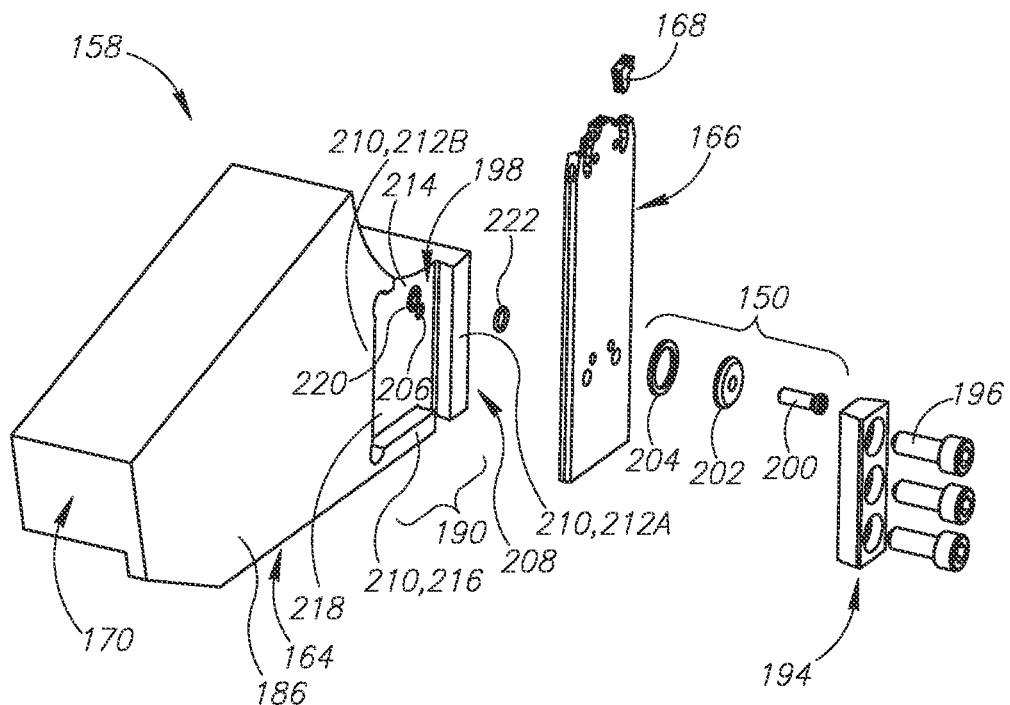
FIG. 7B is an exploded perspective view of the cutting tool assembly in FIG. 7A.

Referring to FIG. 7B, the cutting tool assembly 158 comprises a tool holder 164 and a parting blade 166 mounted to the tool holder 164 and configured to hold a cutting insert 168.

The tool holder 164 further comprises a tool shank 170 and a tool head 190 which comprises a blade pocket 192 to which the parting blade 166 is clamped via a clamp 194 and associated screws 196.

The clamp having tapered side surfaces 195 (FIG. 10D) for clamping the parting blade 166.

Figure 7C:
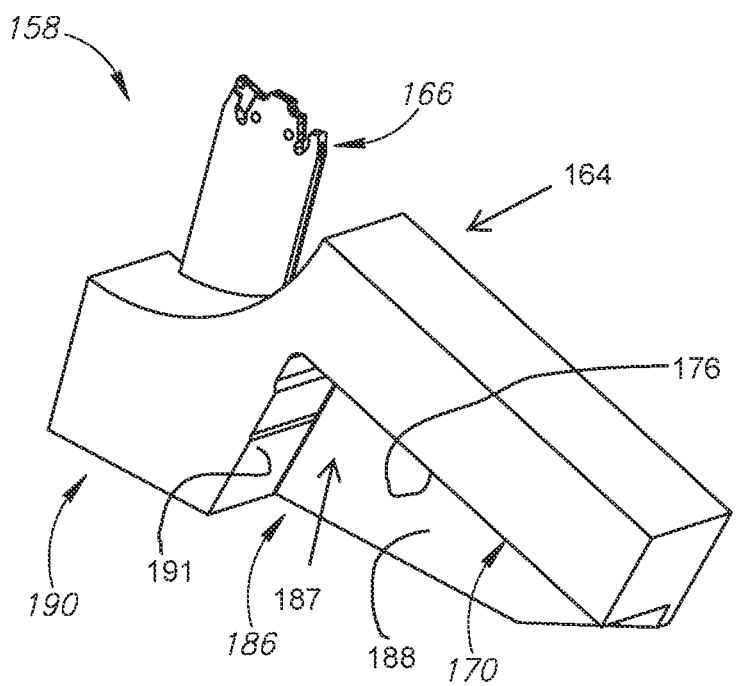
FIG. 7C is rear perspective of the cutting tool assembly in FIG. 7A.

As seen in FIG. 7C, a reinforcement portion 186 connects the tool head 190 and a tool shank 170. $D_U$ e to the reinforcement portion 186, the tool holder 164 has a reinforcement recess 187 defined by the lowermost shank surface 176, a rearward facing surface 191 of the tool head 190, and an inner side surface 188 of the reinforcement portion 186, the inner side surface facing a direction perpendicular to the upward and downward directions. As seen from FIGS. 7B and 7C, the reinforcement recess 187 is spaced apart from the pocket 198 of the tool head, and does not communicate therewith.

The tool head 190 further comprises a blade pocket 198 located at a head side surface 208 thereof. The blade pocket 198 comprises a peripheral wall 210 formed with a pocket opening which opens out in the upward direction.

The peripheral wall 210 can comprise two side wall portions 212A, 212B extending a pocket opening 214. The side wall portions 212A, 212B in this example extend in the downward and rearward directions (FIG. 9A) from the pocket opening 214.

The peripheral wall 210 can further preferably comprise a stopper wall portion 216 located opposite the pocket opening 214.

Figure 11C:
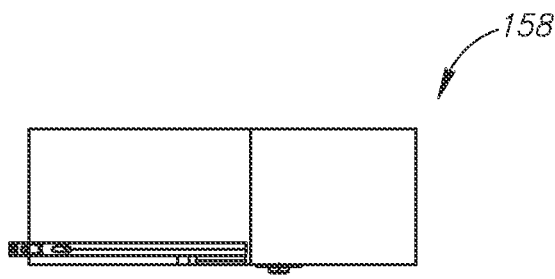
FIG. 11C is a front view of the cutting tool assembly in FIG. 11A.
Figures 11A, 11D, 11E:
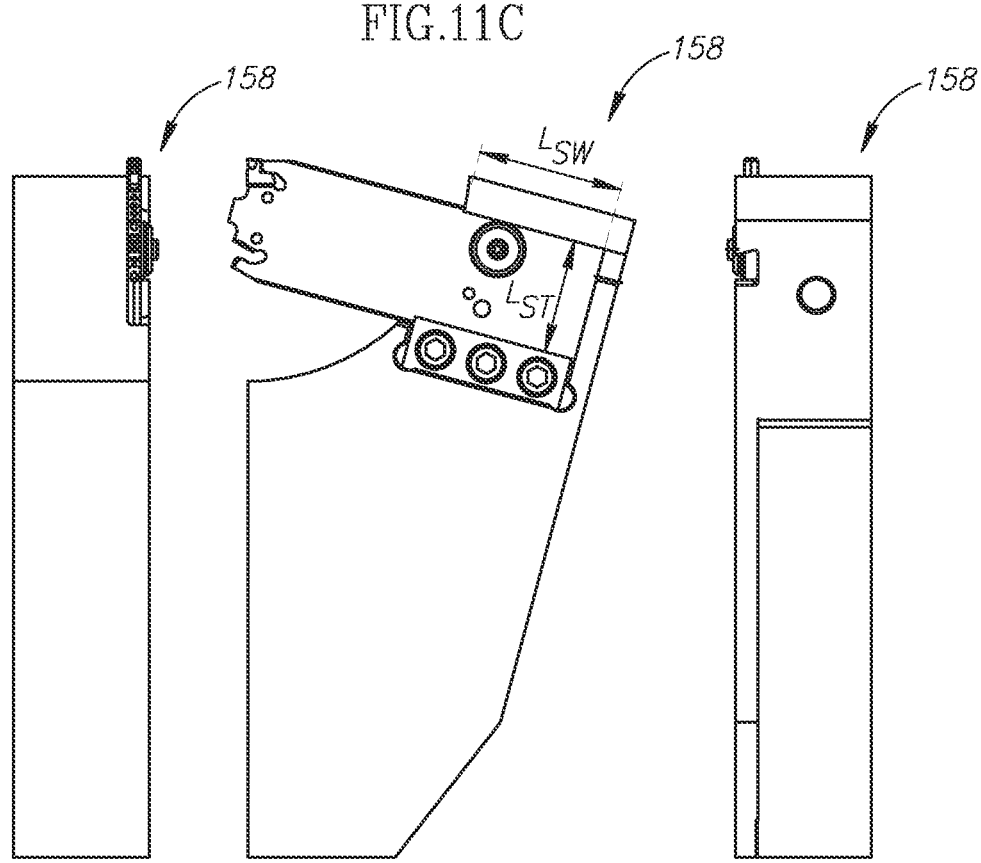
FIG. 11A is a side view of the cutting tool assembly in FIG. 7A.
FIG. 11D is a bottom view of the cutting tool assembly in FIG. 11A.
FIG. 11E is a top view of the cutting tool assembly in FIG. 11A.
Figure 11B:
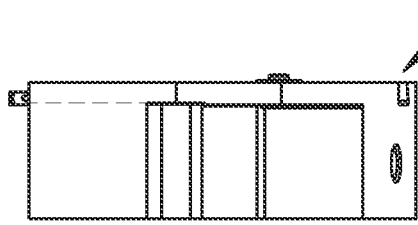
FIG. 11B is a rear view of the cutting tool assembly in FIG. 11A.

In FIG. 11A the side wall portion length $L_{SW}$ and stopper length $L_{ST}$ are shown.

The blade pocket 198 further comprises a pocket surface 218. The pocket surface can be formed with a tool holder coolant outlet aperture 220. In this example the tool holder coolant outlet aperture 220 is configured with a recess 221 to receive an o-ring 222.

The sealing device 150 comprises a threaded screw 200, an annular sealing element 202 and ring 204, but could be one integral component. The threaded screw 200 has a screw head connected to a partially threaded shank portion.

The threaded screw is configured to only threadingly engage a threaded hole 206 formed at the pocket surface 218. Thus, the threaded screw 200 passes through a hole formed in the parting blade, without threadingly engaging that hole. In other words, the parting blade is devoid of a threaded hole configured to threadingly engage a shank portion of a screw passing therethrough.

Figures 9A, 9B, 9C, 9D, 9E:
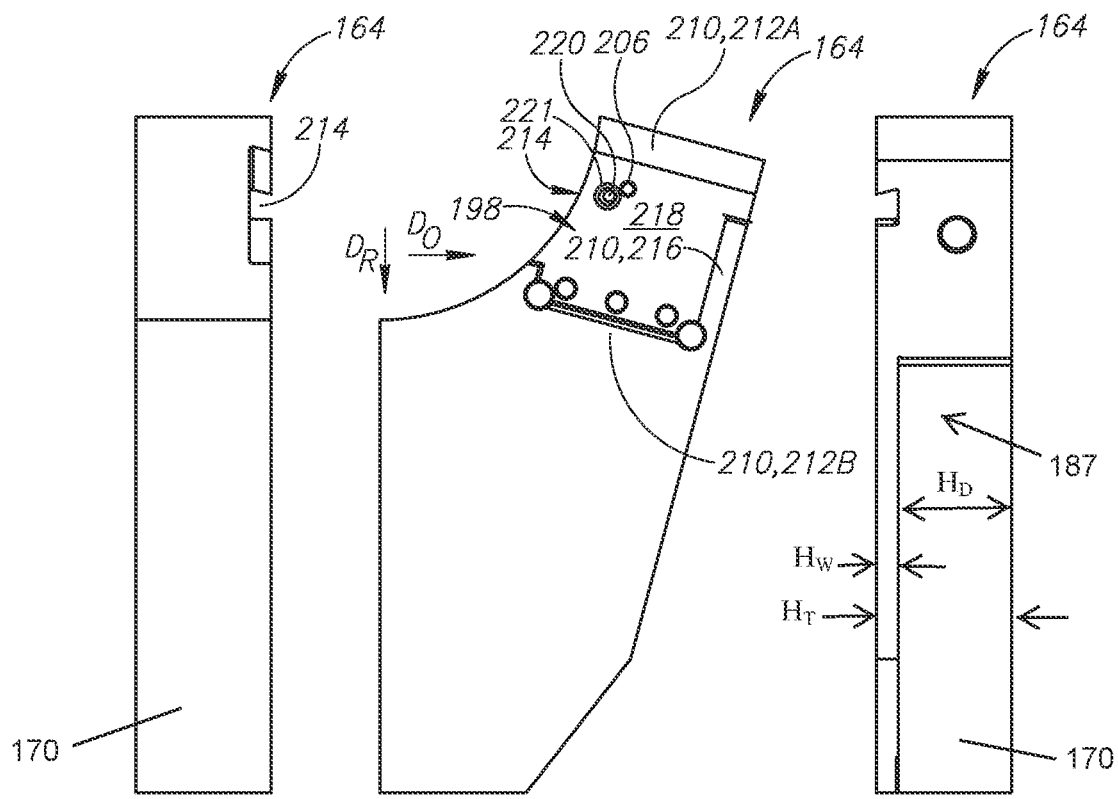
FIG. 9A is a side view of a tool holder of the cutting tool assembly in FIG. 7A.
FIG. 9B is a rear view of the tool holder in FIG. 9A.
FIG. 9C is a front view of the tool holder in FIG. 9A.
FIG. 9D is a bottom view of the tool holder in FIG. 9A.
FIG. 9E is a top view of the tool holder in FIG. 9A.
Figure 10A:
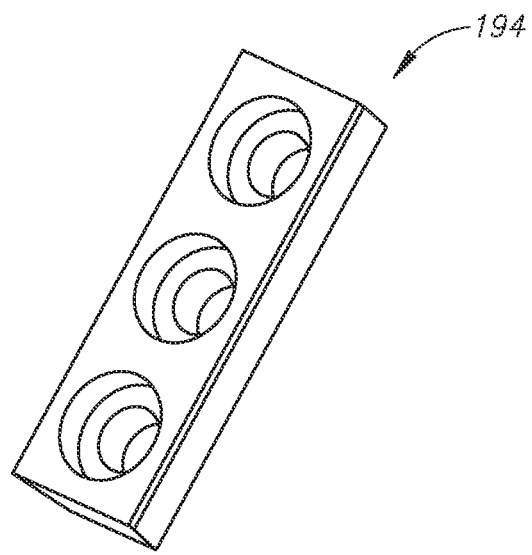
FIG. 10A is a perspective view of a clamp of the cutting tool assembly in FIG. 7A.
Figure 10D:
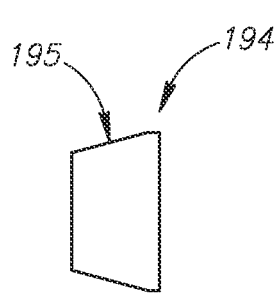
FIG. 10D is a bottom view of the clamp in FIG. 10A.
Figure 10B:
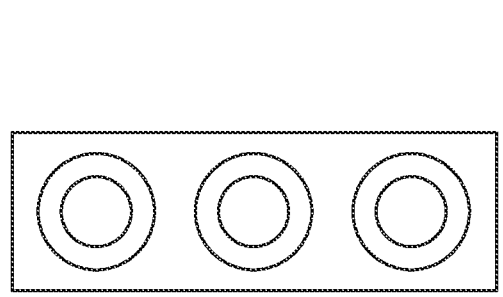
FIG. 10B is a side view of the clamp in FIG. 10A.
Figure 10C:
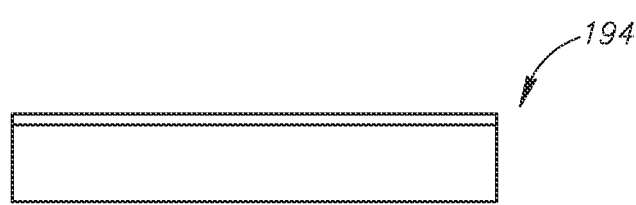
FIG. 10C is a rear view of the clamp in FIG. 10A.

In FIG. 9B a shank height $H_S$, a reinforcement portion width $H_W$ and a reinforcement portion height $H_R$ are shown. The shank height $H_S$ and reinforcement portion height $H_R$ are both measurable parallel to the upward and downward directions and perpendicular to the shank axis, whereas the reinforcement portion width $H_W$ measurable perpendicular to the upward and downward directions and the shank axis. The reinforcement portion height $H_R$ proximate to the tool head, is greater than the shank height $H_S$. The shank height $H_S$ is greater than the reinforcement portion width $H_W$. Accordingly, the reinforcement portion can be described as having a blade shape in a plane parallel with the upward and downward directions and the shank axis. It will be understood that while this shape has been described in connection with FIG. 9B, it is preferred in general for all embodiments of the tool holder. As seen in FIG. 9D, along the tool shank 170, the tool holder 164 has an overall width HT measurable perpendicular to the upward and downward directions and the shank axis, the overall width HT comprising a shank portion width HD and the aforementioned reinforcement portion width $H_W$, the reinforcement portion width $H_W$ being smaller than the shank portion width HD.

Figure 12A:
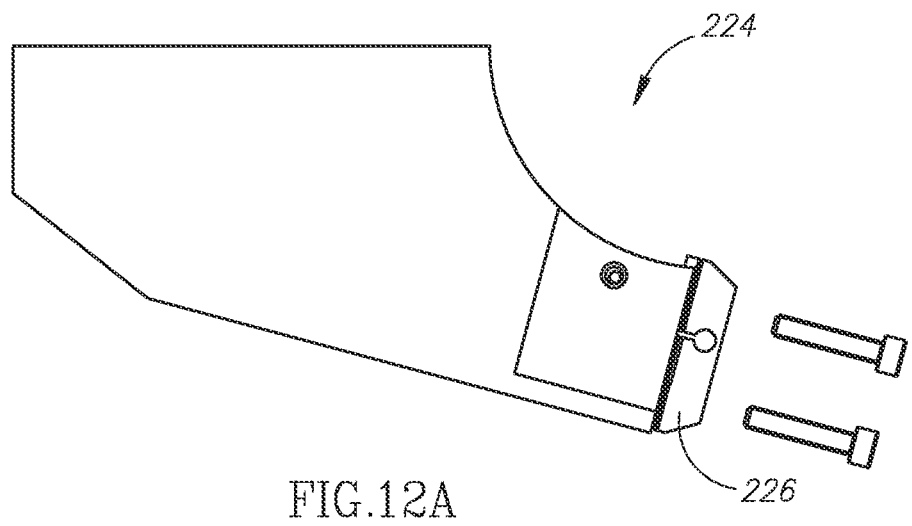
FIG. 12A is a side view of another tool holder according to the present invention.
Figure 12B:
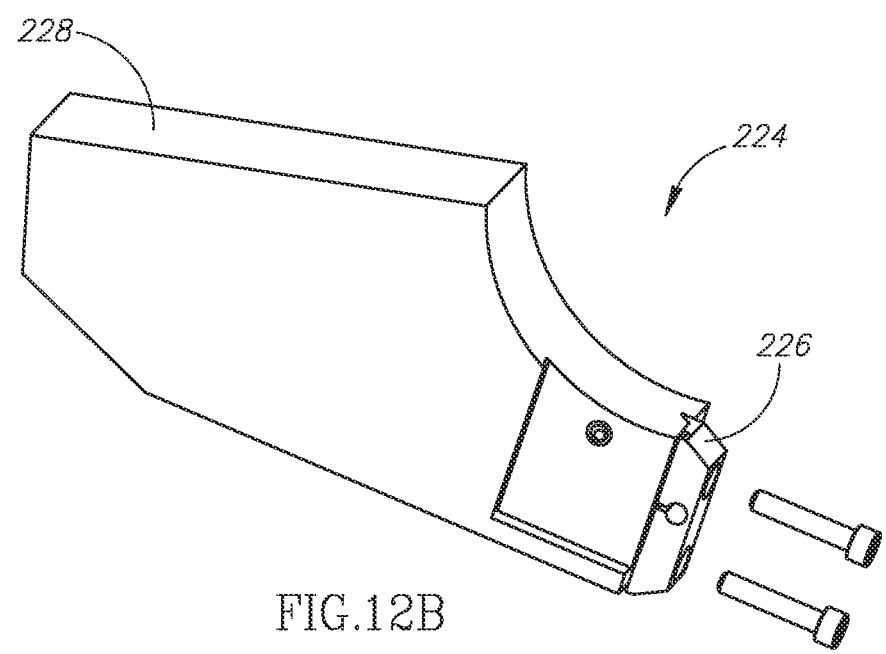
FIG. 12B is a perspective view of the tool holder in FIG. 12A.

Referring to FIGS. 12A and 12B an alternative tool holder 224 is shown. In this example, a clamp 226 is located distal from the tool shank 228, to allow clamping access at a front of the tool holder 224.

FIGS. 13A to 13E show a cutting tool assembly 230 comprising additional features that can be incorporated with any of the aspects of the invention. For example, the reinforcement portion 234 has been engineered to have a largest dimension adjacent a tool head 232. For example, a first part 236 of the reinforcement portion 234 adjacent the tool head 232 has a greatest size. This is followed by a reduction in size at an adjacent portion 238. Finally, at the area designated "240", no noticeable reinforcement portion 234 is visible.

Similarly, the tool head 232 can have a tapered shape 242 to allow access to narrow areas and to reduce material needed for construction.

Finally, an elongated sealing hole 244 is exemplified to allow connection to a threaded hole 206 with some flexibility for fine-tuning.

Referring to FIGS. 14A to 14G, another cutting tool assembly 246 is shown. The cutting tool assembly 246 comprises a tool holder 248 and an indexable parting insert 250. It has been found even for such assemblies that a reinforcement portion 252 extending from a tool shank 254, increases stability. Preferably, as shown in FIG. 14F the cutting insert 252 and the reinforcement portion 252 are aligned along the same plane as shown, similar to the previous embodiments.

Notably, the pocket's peripheral wall in FIG. 14A is open not only in the upward direction but also the forward direction. Thus the peripheral wall supports a cutting insert or blade from the rear and below. Since the support of the peripheral wall extends along the majority of the height of a cutting insert or blade it is expected there is even more support than in the elongated blade embodiments shown, since the upper end of the blade is not supported from behind.

Stated differently, regardless of the type of insert or blade, it is considered an advantageous feature for any of the above aspects for a tool holder to have a reinforcement portion.

Similarly, regardless of the type of insert or blade, a blade pocket or insert seat can advantageously comprise side wall portions only at lowermost and rearmost sides of a pocket surface to support a parting blade or cutting insert from behind and below.

Additionally, in FIGS. 14B and 14G and additional optional feature is shown. Shown with hatching (merely to differentiate this component, not to indicate a section view) is an additional reinforcement portion 253. Similar to the reinforcement portions shown in the other embodiments, it is noted that additional constructional strength can also be provided by the reinforcement portion extending upwardly from the tool shank (i.e. similarly alongside the turret). While the most beneficial configuration is believed to be a downwardly extending reinforcement portion, it is certainly a feasible configuration for the reinforcement portion to extend both downwardly and upwardly from the tool shank, or only downwardly as shown in other embodiments, or only upwardly (not shown). It will be understood that this can be applied to any tool holder of the present invention. While the schematic upwardly extending additional reinforcement portion 253 shown is relatively short compared to the reinforcement portion 252, it will be noted that this size is only shown for illustrative purposes only. Nonetheless, a single, reinforcement portion (e.g. extending only downward from the tool shank) requires less manufacturing steps and a smaller initial workpiece (from which the tool holder is made), and is the most preferred option.

Referring to FIGS. 15A to 15G, another cutting tool assembly 256 is shown. The cutting tool assembly 256 comprises a tool holder 258 and a turning insert 260. It has been found even for such assemblies that a reinforcement portion 262 increases stability.

Figure 8D:
FIG. 8D is a front view of the parting blade in FIG. 8B.
Figures 8B, 8E:
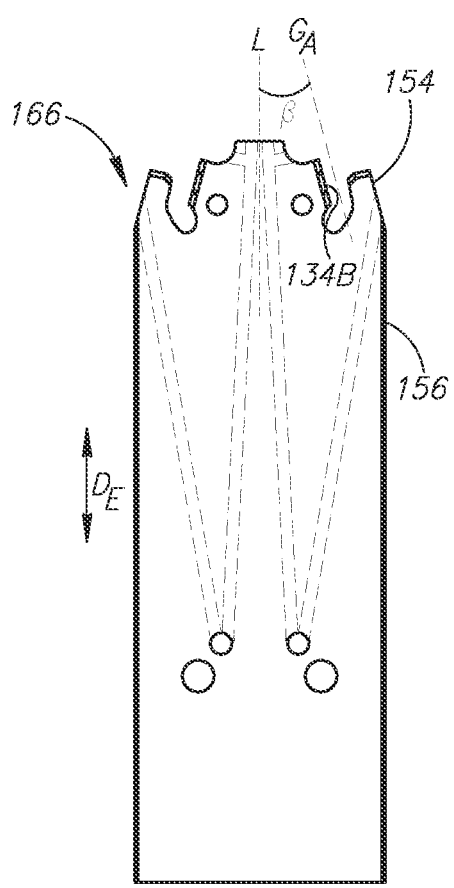
FIG. 8B is a side view of the parting blade in FIG. 8A, showing internal coolant channels in dashed lines.
FIG. 8E is top view of the parting blade in FIG. 8B.
Figure 8A:
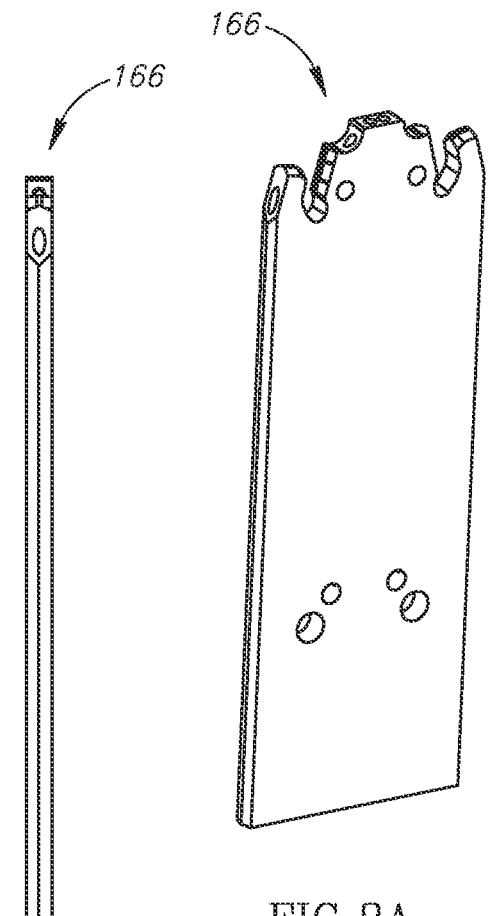
FIG. 8A is a perspective view of a parting blade of the cutting tool assembly in FIG. 7A.
Figure 8C:
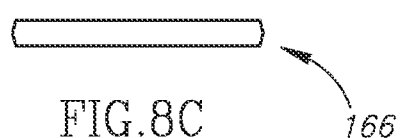
FIG. 8C is a rear view of the parting blade in FIG. 8B.

FIG. 16A illustrates a parting blade 320 with some similar construction to that shown in FIG. 8C (i.e. for example, having a first orthogonal sub-edge 321A, which is optional but preferred, and, more importantly, an oblique sub-edge 325A extending from the orthogonal sub-edge 321A; the oblique sub-edge 325A in this example also being referred to as a first parallel sub-portion).

Notably, the main addition which the parting blade 320 is being brought to exemplify is the a non-linear (bent or curved) elongated blade. All other features such as will be described below (such as a single centrally located insert seat at each end instead of two, and the relationship between the insert seat and the oblique sub-edge and orientations thereof) is equally applicable to all parting blades according to the invention.

Referring to FIGS. 16A to 16E, the parting blade 320 will be described in more detail.

The parting blade 320 comprises first and second side surfaces 322A, 322B, first and second longitudinal edges 324A, 324B, opposing first and second end edges 326A, 326B.

The first and second longitudinal edges 324A, 324B can have a tapered shape as shown.

The first and second longitudinal edges 324A, 324B each have first parallel sub-portions 325A, 325B and second parallel sub-portions 327A, 327B. Notably, the parting blade 320 is symmetric about a blade plane BP for indexing purposes.

In this example the basic elongation direction $D_E$, similar to the parting blade 320 has two non-linear portions. A first basic elongation direction $D_{E1}$ parallel with the first parallel sub-portions 325A, 325B and a second basic elongation direction $D_{E2}$ parallel with the second parallel sub-portions 327A, 327B.

Only a single, first, insert seat 328A is associated with the first end edge 326A, and only a second identical insert seat 328B is associated with the first end edge 326A.

Referring to only the first insert seat 328A, which in any case is identical to the insert seats previously described, it is noted that it comprises first and second insert jaws 330A, 330B, and a lower seat abutment surface 334A formed at the side of the insert seat which is closer to the first longitudinal edge 324A than to the second longitudinal edge 324B.

In the present example, there is only a single insert seat 328A, 328B at each end of the parting blade 320. While this results in fewer insert seats, since each one is recessed towards the center of a respective end edge, a more stronger parting blade structure is provided. Stated differently, the insert seats are basically in the center of the parting blade (spaced from both the first and second longitudinal edges 324A, 324B). Accordingly, the orthogonal sub-edges 321A, 321B are considered part of the end edges and not part of the parallel longitudinal edges.

Between the first parallel sub-portion 325A and adjacent second parallel sub-portion 327A, there can be a curved relief portion 332 to provide relief when mounted to a tool holder.

In this preferred example, the insert seat 328A opens out to only the first end edge 326A. However, it will be understood that such parting blade could have other insert seat structures, for example similar to that shown in FIG. 2 where the insert seat opens out to both the first end edge and first longitudinal edge, or (not shown) opening out to only the first longitudinal edge.

Regardless of the type of insert seat, the parting blade is considered advantageous since, relative to the first insert seat 328A, a proximate portion 325A of the first longitudinal edge 324A extends underneath the lower seat abutment surface 334A. Thus this parting blade is advantageous because it extends in the first basic elongation direction $D_{E1}$ which is also essentially the same direction as the cutting force applied to the blade resulting in strong stability of the parting blade. Currently the optimal oblique blade angle θ1 known is 30° as shown, but other angles also performed well.

As a separate independent advantage to the stability, the insert seat is basically in the center of the blade.

It will be understood that such features are equally applicable to the linear parting blade 166 shown in FIGS. 8A to 8E.

The parting blade 320 has a completely separate aspect in that it has a non-linear shape. This aspect is not related to the constructional strength features described above but allows the parting blade to be mounted in different tool holders.

Figure 17:
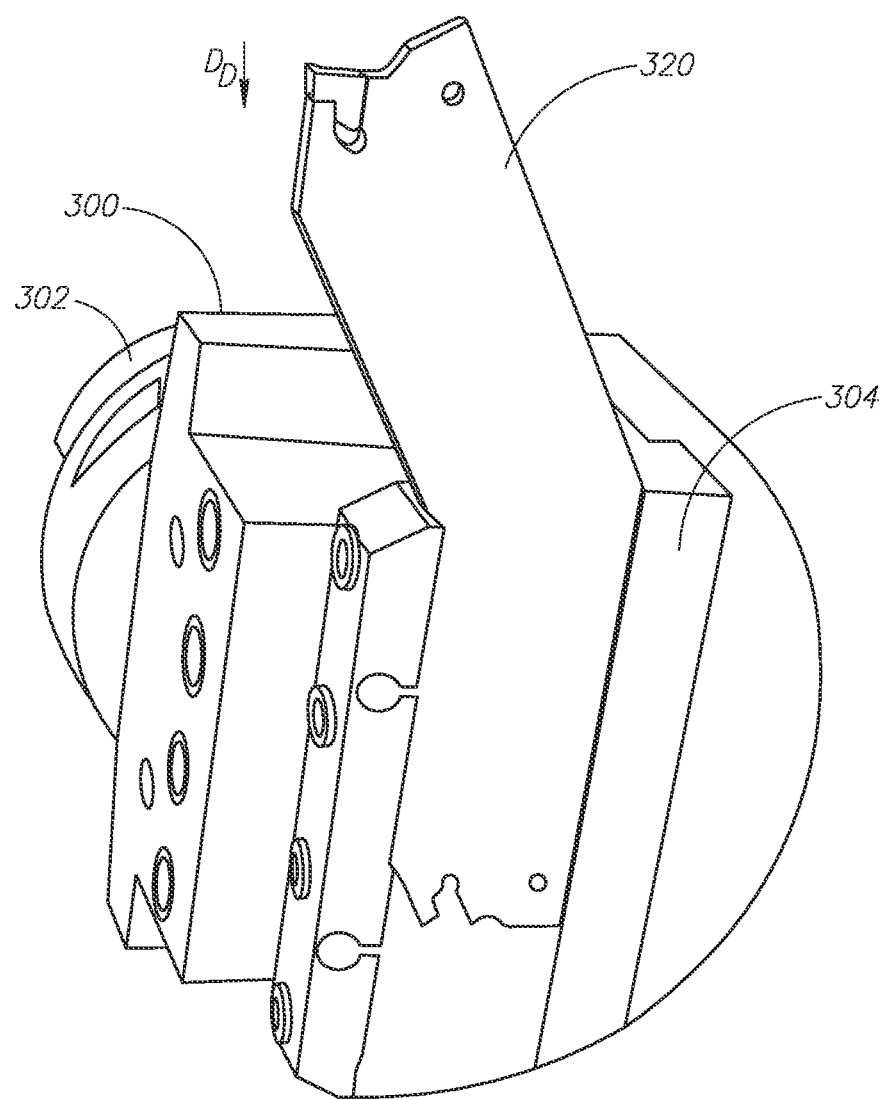
FIG. 17 is a perspective view of the parting blade in FIG. 16A being mounted to a tool holder which in turn is mounted to an adaptor.

For example, as shown in FIG. 17, the parting blade 320 can be held by a prior art tool holder 304 (the one shown is sold under the name Iscar SGTBU 32-6G).

For the sake of completeness, the adaptor 300 shown holding the tool holder 304 is sold under the name Mazak adaptor C8 ASHA 56085-32A.

The adaptor 300 has a shank 302 which extends into the page, i.e. basically perpendicular to the first and second side surfaces of the parting blade 266. One benefit of the shank 302 extending perpendicular to the blade is the reduced overhang, compared with an adaptor (not shown) having a shank extending in the rearward direction $D_D$ of the parting blade 266. However, such construction can have a more limited cut depth since the adaptor 300 is relatively close to the workpiece. Nonetheless, this may be compensated by increasing the length of the parting blade (which, however, increases the overhang of the parting blade itself).

Additionally, the parting blade 320 can also be configured to be mounted in the tool holder 64 which was not originally designed to receive a non-linear parting blade.

Thus the exemplified non-linear parting blade can be mounted in both prior art tool holders and the new tool holders of the present invention.

Additionally, the non-linear parting blade can also have a variable overhang length.

The above mentioned at least one additional abutment surface can be either an abutment surface of an upper jaw (similar to the pocket type shown in FIG. 2, the upper jaw being designated as "36", and accordingly the at least one additional abutment opposes the lower seat abutment surface) or can be a rear seat abutment surface (similar to the pocket type shown in FIG. 5B, designated as "134B", and accordingly the at least one additional abutment is basically perpendicular to the lower seat abutment surface). The precise orientation of the additional abutment surface is not of importance, rather it will be understood that typically an insert needs to be secured by more than one abutment surface and the location of the lower seat abutment surface is being used to describe the relative orientation of the proximate portion. It will also be understood that the lower seat abutment surface can, and often will, be other than a flat surface but that it basically lies in a seat plane $P_S$ (see FIG. 16B). The seat plane being basically perpendicular to the first and second side surfaces and parallel with the forward and rearward directions ($D_F$, $D_R$).

The elongated parting blade can have a linear shape non-linear shape. For example, the elongated parting blade can be bent or curved. In embodiments where the parting blade comprises a bend, the bend can be located at about the center of the length of the blade. Preferably, the bend can be exactly in the middle of the length of the blade, allowing the blade to be equally indexable about the middle thereof.

Referring to FIGS. 24A to 24E, another cutting tool assembly 600 is shown.

The cutting tool assembly 600 is similar to the assembly 246 in FIGS. 14A to 14F, except that instead of a five-way indexable symmetrically rotatable insert 250 being exemplified, a five-way symmetrically rotatable indexable parting blade 602 with five insert seats 604 is shown.

The tool holder 606 is similar to that shown in FIG. 14, in that there is a reinforcement portion 608 supporting a tool head 609, and in that there is a pocket 610 (as well as the parting blade 602) aligned in the same plane as the reinforcement portion 608.

Also in similarity to FIG. 14A, the tool holder's pocket's peripheral wall 612 (the abutment surfaces of which are a rear sidewall portion 614 and what is called above a stopper wall portion 616, although here both wall portions provide the same function) is open not only in the upward direction $D_U$ but also the forward direction $D_F$. For the sake of completeness the pocket 610 further comprises a pocket surface 617.

The rear sidewall portion 614, the stopper wall portion 616 and the pocket surface 617 are the abutment surfaces of the tool holder 606 exemplified. In other words, the parting blade 602 abuts only the rear sidewall portion 614, the stopper wall portion 616 and the pocket surface 617. There is no additional side wall portion at the front of the tool holder 606 as per previous embodiments having a clamp.

One advantage of such type of pocket design is that it completely supports a cutting insert (FIG. 14A) or blade (FIG. 24A) in both in the rearward direction $D_R$ and the downward direction $D_D$. In other words there is no overhang or unsupported portion of a parting blade in the direction that cutting forces are applied (e.g. see the direction of cutting force $F_C$ in FIG. 6), resulting in improved stability.

Consequently, this is one reason such arrangement has been found to be even more stable than the elongated parting blade embodiments described above.

As mentioned initially, the current invention was developed for long overhangs. More precisely, the current invention was developed for relatively large depths of cut, which was thought to require either an elongated blade having an overhang or unsupported portion, or a massive tool assembly which is impractical.

In order to provide the preferred orientation of the parting blade described above, a relatively large tool head (i.e. significantly larger than the tool shank in the upward and downward directions) was required. To provide proper support for the extremely large tool head the reinforcement portion was invented.

It was subsequently discovered that the reinforcement portion even provides additional stability to inserts and other parting blades, even different to the elongated parting blades described above as already explained above.

Nonetheless, a fully supported indexable parting blade for large depth of cut was not initially conceived due to space limitations. Practically speaking, there is a limit to the tool head size or parting blade size that is practical to fit into a standard turret or machine. Accordingly, compactness is still a market requirement. Similarly, it is common knowledge that increased overhang increases instability and therefore machinists choose an appropriate size tool for machining, with a minimum overhang. One of the benefits of the tool assembly shown in FIGS. 1 and 2 is that the overhang distance can be reduced for smaller depth of cut applications, resulting in increased stability.

The present embodiment (e.g. FIG. 24A) shows a new inventive concept that a non-elongated parting blade (in the sense described above) can be configured for relatively large depths of cut when compared with a relatively small tool holder.

Figure 24C:
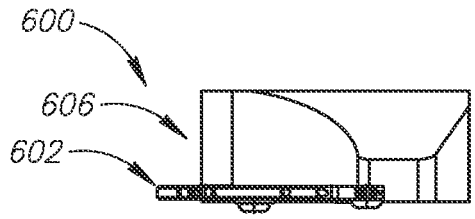
FIG. 24C is a front view of the tool assembly in FIG. 24A.
Figures 24A, 24D, 24E:
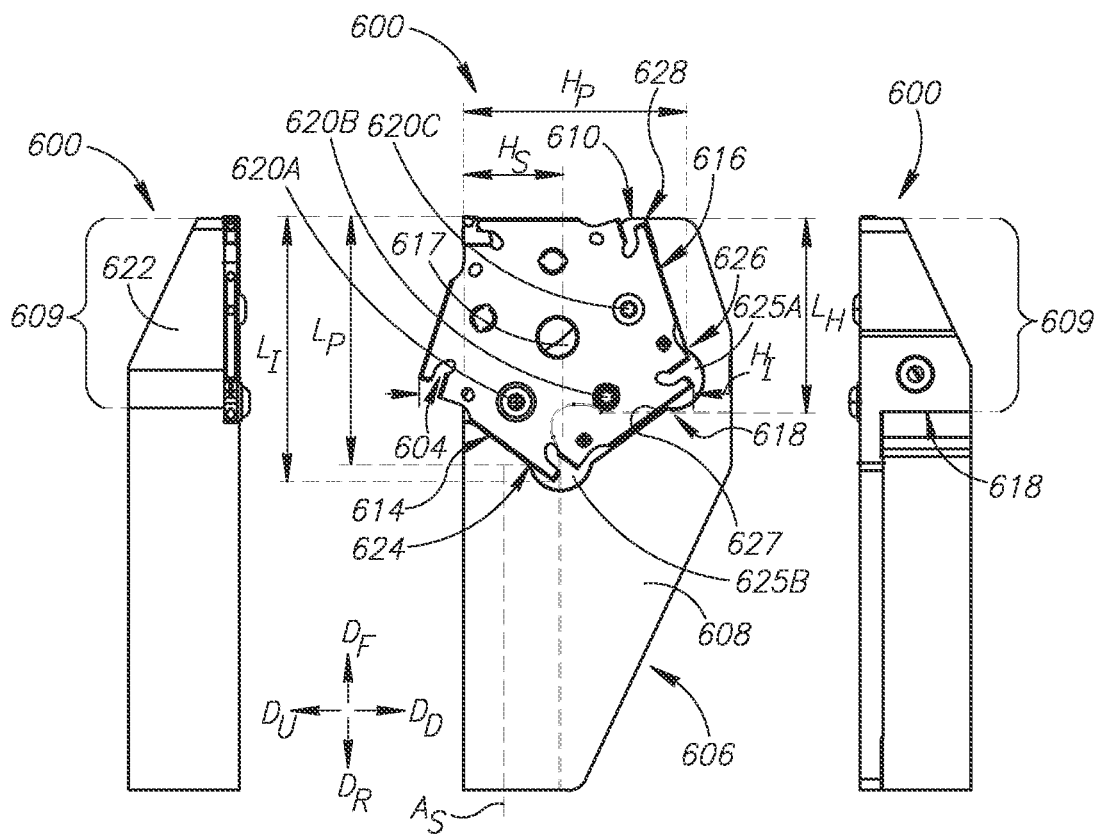
FIG. 24A is a side view of a tool assembly including a parting blade and a tool holder as well as screws and a cutting insert, the dashed lines showing an opposite side of the tool holder.
FIG. 24D is a bottom view of the tool assembly in FIG. 24A.
FIG. 24E is a top view of the tool assembly in FIG. 24A.
Figure 24B:
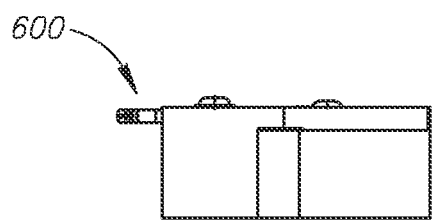
FIG. 24B is a rear view of the tool assembly in FIG. 24A.

This has been accomplished by the discovery that a standard pocket with lower and rear peripheral walls, can be made to extend rearward of a tool head, utilizing the area alongside a turret. For example, as seen in FIGS. 24A and 24D, the peripheral wall 612 of the pocket 610 has a rear side wall portion 614 which is partially rearwardly located relative to the tool head's rear surface 618. In other words, at least a portion of the rear side wall portion 614 is located rearwardly of the tool head's rear surface 618. And in the embodiment seen in FIGS. 19A and 19D, the peripheral wall of the pocket 456 has a rear side wall portion 400 which is entirely rearwardly located relative to the tool head's rear surface 458. In other words, the entirety of the rear side wall portion 440 is located rearwardly of the tool head's rear surface 458.

Stated differently the tool holder's pocket can extend from a tool head, located forward of a shank, in the rearward direction $D_R$ until it is rearward of a tool head's rear surface 618 (i.e. the stopper surface thereof). Accordingly, the parting blade 602 can also extend rearward of a turret's front surface (FIG. 4D, surface designated as "99") allowing the overall dimension of the tool head 609 and parting blade 602 to only project forward of the turret a relatively smaller amount than if the entire pocket is located forward of the tool head's rear surface 618 (more precisely the portion of the head which abuts a turret, a stopper surface). It will be understood that a tool holder need not be moved rearwardly until the rear surface 618 abuts a turret front surface 99 for it to be used, however, regardless of whether there is contact, the rear surface 618 in any case defines a minimal overhang of a tool head 609.

It will also be noted that in contrast to other parting tools, a significant benefit of the present invention is that there is no tool clamp above (either directly above or above and rearward of) the rake surface of a cutting insert. Thus there is no construction to impede chips passing over said rake surface.

It will also be noted that in contrast to other variable position parting tools such as those shown in FIGS. 1 and 2, there is significant benefit to the fixed parting blade position, requiring less set up time. Further such tools require extra non-integral parts. It will be noted how few parts the present invention comprises. Namely, a single tool holder and parting blade mounted thereto by standard screws (not including optional coolant accessories, or a biasing element discussed below).

Clearly, as an additional benefit, the reinforced portion 608 is provided for additional structural strength, noting the large size of the parting blade involved, allowing more aggressive machining operations to be undertaken, or alternatively, providing even better stability in normal machining operations.

In fact, it has been found that the present concept is so stable that even for small cut of depth machining operations, the tool provides superior stability and finish. In other words, the same tool which can be used for large depth of tool operations can also be a first choice for small depth of tool operations since the tool is both relatively compact and even more stable than smaller tools. This also means that the benefit of variable depth adjustment of known parting blades is no longer needed.

It will be noted that the preferred embodiment does not use a clamp of the type shown above, but rather, for example, multiple screws 620A, 620B, 620C allowing the tool head 609 to be more compact. Preferably the screw holes (not shown) can be located near the concave surface 622 of the tool head 609 for best stability. While the exact number of screws or clamping arrangement is not critical, clearly the lack of a front side wall portion (e.g. of the type designated 212A in FIG. 7B) or a clamp at that location (as exemplified in FIG. 12B) or a clamp at the opposite side (as exemplified in FIG. 11A) assists in providing a more compact structure.

While this benefit is believed to be primarily beneficial for parting blades which are typically far larger than cutting inserts such as those shown in FIG. 14A, and hence a blade pocket has been exemplified, in principle the same tool construction is possible for inserts, with only the name blade pocket being exchangeable with insert seat. However, typically a single screw or clamp is sufficient for mounting a cutting insert since it is typically made of cemented carbide which is harder than steel (the typical material used for parting blades).

In addition to the beneficial dimensions of the reinforcement portion 608 already mentioned in connection to other embodiments, to exemplify the difference of the tool holder and/or parting blade dimensions now achieved, some relationships will be described.

The rear sidewall portion 614 can have a rearmost point 624.

The tool holder 606 can have a forwardmost point 628.

The stopper wall portion 616 can have a lowermost point 626.

A pocket length $L_P$ is defined is defined parallel to the shank axis As from the rearmost point 624 of a rearmost abutment surface (which in this case is the rear sidewall portion 614) to the forwardmost point 624 of the tool holder 606. It will be understood that the present embodiment and has relief portions 625A, 625B between wall portions of a pocket, but that these are not reflective of the size of the parting blade to be mounted to the pocket and hence the abutment surfaces have been chosen as a reference for pocket size. It is also noted that one of the sides of the parting blade and the adjacent side wall, together designated 627 are slightly spaced apart from each other and are hence not abutment surfaces.

A pocket height $H_P$ is defined perpendicular to the shank axis As from the lowermost point 626 of a lowermost abutment surface (which in this case is the stopper wall portion 616) to the uppermost point of the tool holder 606.

Similarly, a tool head length $L_H$ is defined parallel to the shank axis As from the rear surface 618 to the forwardmost point 624 of the tool holder 606.

A parting blade height $H_I$ is defined perpendicular to the shank axis As from the lowermost point of the parting blade 602 to an uppermost point of the parting blade 602.

When regarding the tool holder 606 alone, indicative of the present concept is the length of the tool head 609 being smaller than the length of the pocket 610.

Stated differently, preferably the pocket length $L_P$ is greater than the tool head length $L_H$ which provides the beneficial compact tool head 609 while allowing a large depth of cut.

In designs produced the pocket length LP is greater than the tool head length $L_H$ by at least 10%, preferably greater than 20%. For example, in the example given: $L_P/L_H$=1.26, i.e. about 26%. An upper limit has not yet been determined.

Similarly, when regarding the tool assembly 600, indicative of the present concept is the length of the tool head 609 being smaller than the length of the parting blade 602.

As shown, the corresponding length of the parting blade 602 is even larger than the pocket length $L_P$ as the parting blade extends rearwardly therefrom, although they are approximately the same size. Stated differently, preferably the parting blade length (defined parallel to the shank axis As from a rearmost point of the parting blade 602 to a forwardmost point thereof) is greater than the tool head length $L_H$, which provides the beneficial compact tool head 609 while allowing a large depth of cut.

In designs produced the parting blade length $L_I$ is greater than the tool head length $L_H$ by at least 10%, preferably greater than 20%.

The next notable relationship are the heights of the various components.

Firstly, it will be understood that the stability of known tool assemblies derive from their structural strength which is typically related to cross sectional tool shank size. Since the tool shanks are typically of square or circular cross section, the height will be taken as the relevant variable, noting that most of the cutting forces are in the downward direction $D_D$.

Notably, the tool shank height $H_S$ is smaller than the pocket height HP. Preferably the tool holder fulfills the condition: $H_P \geq 1.5H_S$, and most preferably $H_P \geq 2H_S$. For example, if the tool shank height $H_S$ is 20 mm it is preferred that the pocket height is greater than 30 mm or even greater than 40 mm. It will be understood that to provide stability the reinforcement portion is highly beneficial.

Similarly, when regarding the tool assembly 600, indicative of the present concept is the parting blade height $H_I$ being greater than the tool shank height $H_S$. It will be noted that the parting blade height $H_I$ is even greater than the pocket height $H_P$. Thus similarly, preferably the tool assembly fulfills the condition: $H_I \geq 1.5H_S$, and most preferably $H_I \geq 2H_S$.

Notably, the design shown is suitable for common tool shank heights (19 mm-32 mm), meaning that all other dimensions can remain the same and only the tool shank height (and width for a typically square cross section) be altered.

Notably a reinforcement portion height $H_R$, at least directly adjacent to the tool head, for the current design is approximately two to three times the size of the tool shank height $H_S$.

It will be noted that since the present concept uses screws, it is not essential for the wall portions of the pocket to be tapered since the screws bias the parting blade against the pocket surface, which reduces production steps for the parting blade since tapered edges are no longer needed.

On the other hand, tapered edges may allow less screws to be used, and other advantages and hence is also feasible to incorporated tapered edges into the parting blade and wall portions.

Referring now to FIGS. 18A to 20E, yet another cutting tool assembly 400 is shown. Further to the development of the five-insert-seat parting blade 602 shown in FIGS. 24A to 24E, it was discovered that a four-insert-seat parting blade 402 may allow an even more compact tool holder 404 and has excellent stability, even though the tool life of the parting blade 402 is relatively reduced due to having one less insert seat 408.

Additionally, during development, even further unique features were developed which can be applied to other shaped parting blades.

Figure 18B:
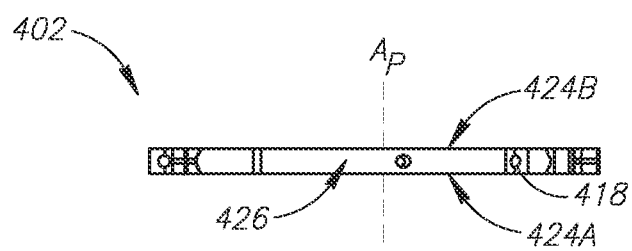
FIG. 18B is a top view of the parting blade in FIG. 18A.
Figure 18A:
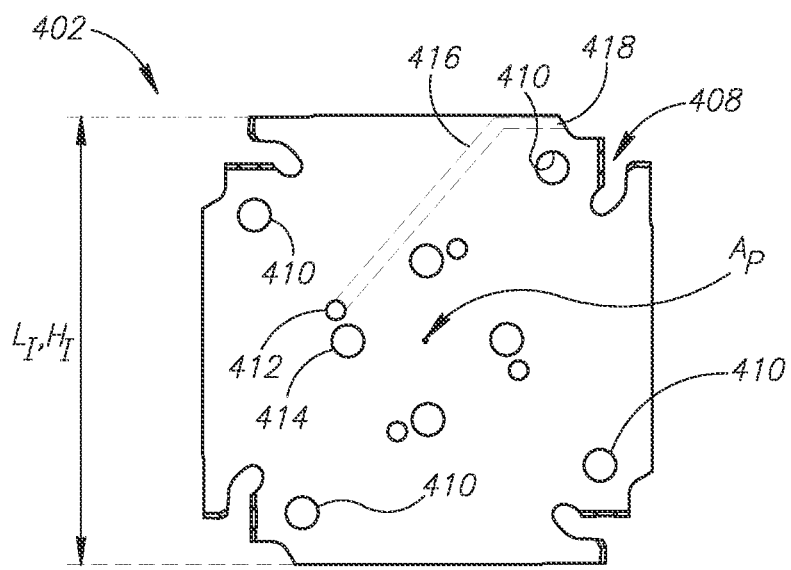
FIG. 18A is a side view of another parting blade.
Figure 18C:
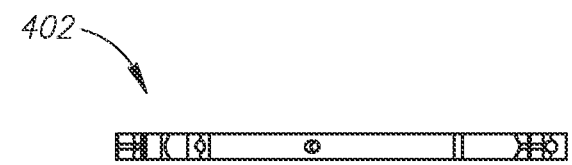
FIG. 18C is a bottom view of the parting blade in FIG. 18A.
Figure 20C:
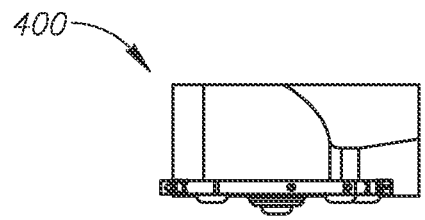
FIG. 20C is a front view of the tool assembly in FIG. 20A.
Figures 20A, 20D, 20E:
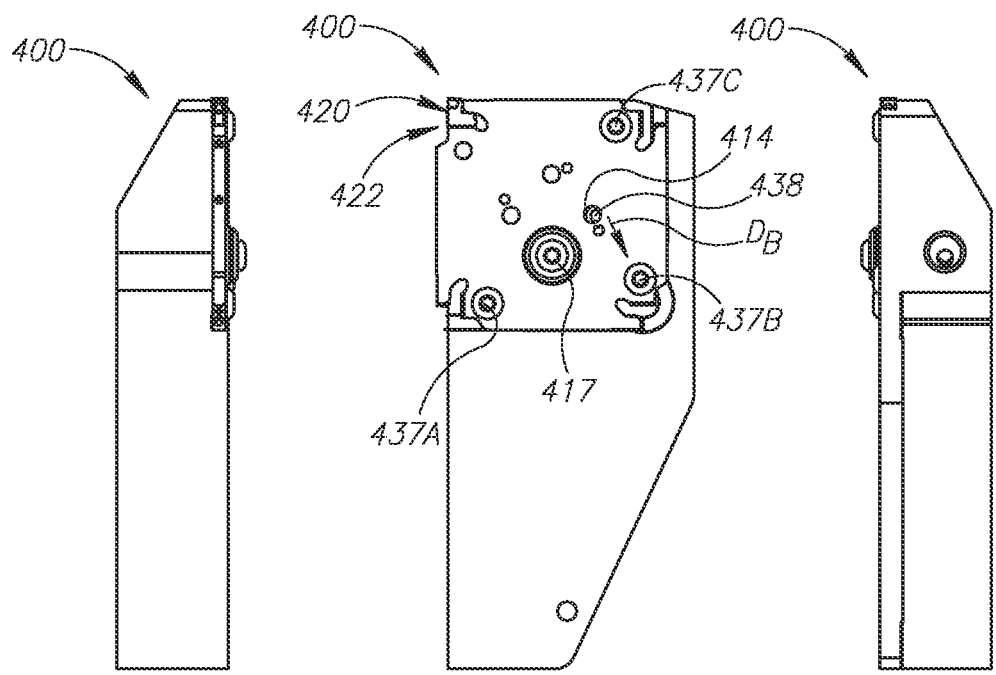
FIG. 20A is a side view of a tool assembly including the parting blade in FIG. 18A and the tool holder in FIG. 19A, as well as screws, coolant sealing device, a biasing element and a cutting insert.
FIG. 20D is a bottom view of the tool assembly in FIG. 20A.
FIG. 20E is a top view of the tool assembly in FIG. 20A.
Figure 20B:
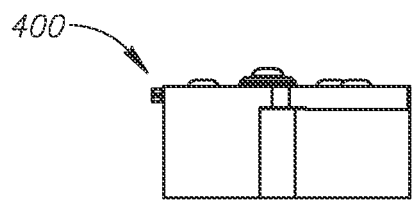
FIG. 20B is a rear view of the tool assembly in FIG. 20A.
Figures 21A, 21B, 21C:
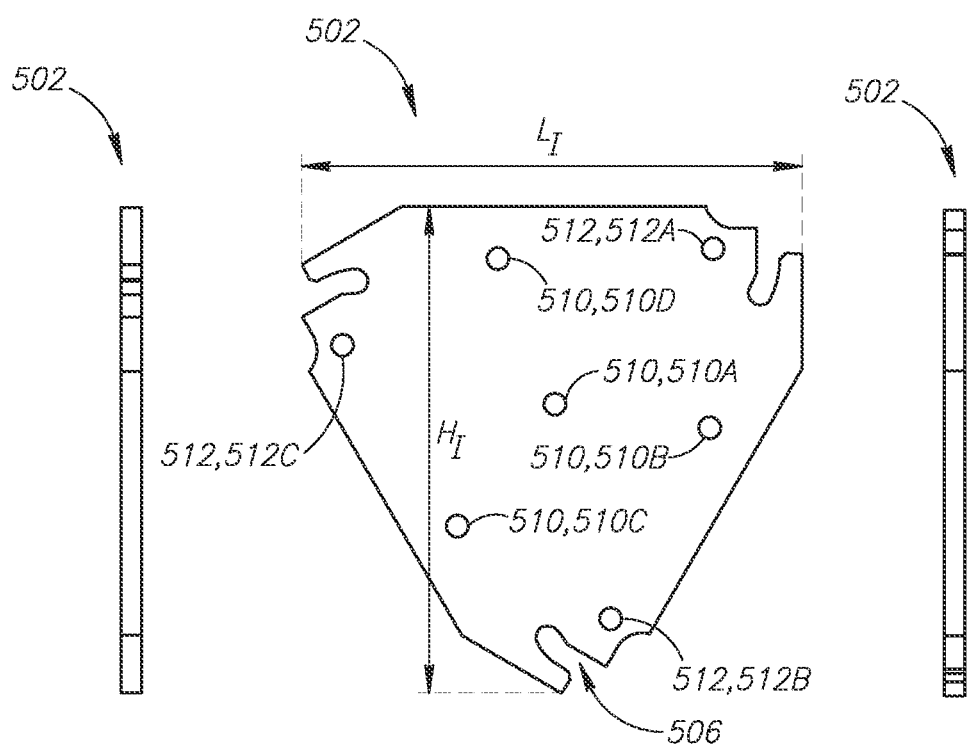
FIG. 21A is a side view of another parting blade.
FIG. 21B is a front view of the parting blade in FIG. 21A.
FIG. 21C is a rear view of the parting blade in FIG. 21A.

Referring to FIGS. 18A to 18C, next to each insert seat 408 there is a blade hole 410 for insertion or ejection of an insert as is known in the art. However, these particular blade holes 410 have been enlarged to serve a double function of being screw receiving holes as shown in FIG. 20A. This allows a stronger constructional strength of the parting blade 402 and less production of holes.

Similar to other embodiments, a blade inlet aperture 412 is adjacent to a sealing hole 414. The sealing hole 414 is preferably threadless for the advantages discussed above. An internal blade passageway 416 is schematically shown and can extend from the blade inlet aperture 412 to a blade outlet aperture 418. A sealing device 417 (FIG. 20A) similar to those described above or of any desired construction can be provided to seal the blade inlet aperture 412, if needed.

The parting blade 402 is four-way-indexable about a central parting blade axis $A_P$. While only a single blade passageway 416 is being discussed and shown it will be understood there are four such passageways.

Notably, due to the rotatable symmetry of the present embodiment and the blade inlet aperture 412 being spaced from the parting blade axis Ar only a single blade passageway 416 and blade outlet aperture 418 is provided for each insert seat 408. As only one outlet aperture 418

Preferably the peripheral edge comprises straight or substantially straight bearing surfaces (i.e. in a side view of the parting blade, such as FIG. 18A) extending between each insert seat 408.

Figures 19A, 19B, 19C, 19D, 19E:
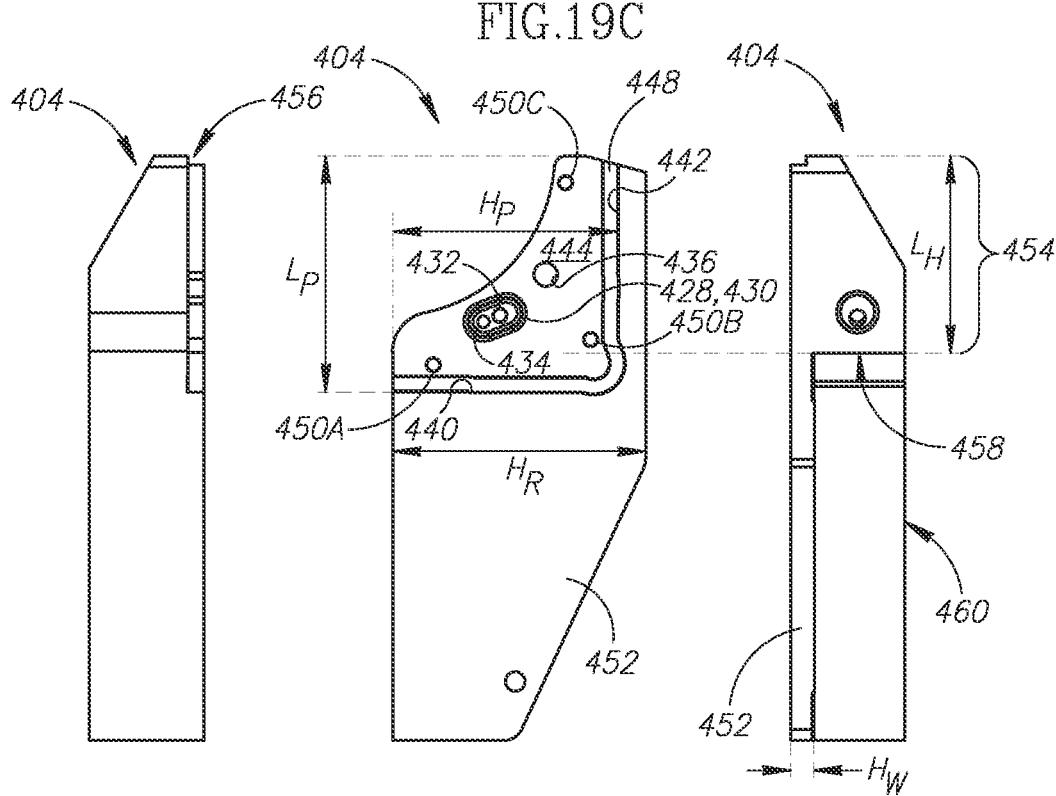
FIG. 19A is a side view of a tool holder configured to hold the parting blade in FIG. 18A.
FIG. 19B is a rear view of the tool holder in FIG. 19A.
FIG. 19C is a front view of the tool holder in FIG. 19A.
FIG. 19D is a bottom view of the tool holder in FIG. 19A.
FIG. 19E is a top view of the tool holder in FIG. 19A.

Referring to FIGS. 19A to 19B, the tool holder 404 is similar to those described above except for the following notable features.

A single o-ring 428 and associated, preferably elongated, groove 430 surrounds both a threaded tool hole 432 and a tool holder coolant outlet aperture 434, for simplicity of manufacture.

A biasing hole 436 can be provide for a biasing element 438 (FIG. 20A). Advantageously, the biasing hole 436 is located in a position corresponds to a hole already provided in the parting blade 402. Optimally such hole is near the central parting blade axis $A_P$ so that the parting blade 402 can be biased in a single biasing direction $D_B$ (FIG. 20A) i.e. towards where the tool abutment surfaces (i.e. side wall portions 440, 442) converge. For example, the hole is preferably either the blade inlet aperture 412 or, as in this example, the sealing hole 414. It will be understood that while it is preferred that the biasing direction is directly between the two abutment surfaces, it may be slightly more towards one or the other, as long as there is at least a partial force towards both.

To elaborate, optionally, but preferably, before securing the parting blade 402 into a mounted position via screws 437A, 437B, 437C on the tool holder 404 it is beneficial for it to be biased into the clamping position.

One common way to provide desired biasing is to design at least one of the screw holes with an offset position so that it biases the parting blade in the biasing direction $D_B$.

This preferred way utilizes the biasing element 438, which can be a resilient element, in this example sold by Erwin Halder K G under the name "lateral plunger" (designation no. EH 2215) which is secured to said a pocket surface 444 via the biasing hole 436. Of course, such biasing is completely optional, but is preferred.

Finally, the side wall portions 440, 442 are oriented at approximately a right angle to each other. A relief groove 448 is provided adjacent the side wall portions 440, 442 which allows the peripheral edge 426 of the parting blade 402 to be flat (i.e. provided without a chamfer or taper) thereby reducing the production steps thereof.

For the sake of completeness, it is noted that the pocket surface 444 is provided with a plurality (preferably at least three) of threaded tool holes 450A, 450B, 450C.

Generally speaking, it is noted that a separately inventive aspect of the present invention is a tool assembly 400 comprising a parting blade 402 having a blade hole 410 adjacent each insert seat 408 configured for ejection or insertion of a cutting insert 422; and a tool holder 404 having threaded tool holes 450A, 450B, 450C at corresponding positions to the positions of the blade holes 410.

Similar advantages to those detailed in connection with the tool assembly 600 in FIGS. 24A to 24E will now be described.

The tool holder 404 comprises a reinforcement portion 452 supporting a tool head 454, and the pocket 456 (as well as the parting blade 402) are aligned in the same plane as the reinforcement portion 452.

Notably the pocket 456 extends rearwardly of a tool head's rear surface 458. Notably, at least a portion of one of the tool abutment surfaces, specifically the rear tool abutment surface 440 (rear side wall portion 440) in this example, is formed on the reinforcement portion 452. More specifically, as seen from FIGS. 19A and 19D of this embodiment, the entirety of the rear side wall portion 440 is located rearwardly of the tool head's rear surface 458, and the rear side wall portion 440 is considered to be entirely rearwardly located of the tool head's rear surface 458.

In other words it has been found that the reinforcement portion 452 can not only be provided as additional structural support, but also as part of a tool pocket 456. This may be counterintuitive in that such design involves removing some of the material of the reinforcement portion and hence weakening it, but it has been found that this has been overall advantageous.

Generally speaking, it is noted that a separately inventive aspect of the present invention that a reinforcement portion connecting a shank and a tool head can comprise at least a portion of a pocket.

Although, notably, a majority of a pocket 456 can preferably extend forward of tool head's rear surface 458. It is noted that a tool head 454 can provide significant support for a parting blade 402.

Advantageously, none of the threaded tool holes 450A, 450B, 450C are not formed on the relatively thin reinforcement portion 452 but rather on the tool head 454 or the shank portion 460 (i.e. tool hole 450 A is formed rearward of the tool head's rear surface 458 yet on the shank portion 460). However it is noted that it is not completely unfeasible to provide a threaded tool hole on the reinforcement portion, albeit a smaller screw (not shown) may be needed.

Generally speaking (i.e. with reference to all embodiments), it is noted that a reinforcement portion is disadvantageous in that it increases the projection of the tool holder in a direction away from a turret. Accordingly, a reinforcement portion width $H_W$ while beneficially providing structural strength should still be as small as possible. Thus, preferably, a reinforcement portion width $H_W$ should be less than 20 mm, preferably less than 10 mm. However as some significant width is need for structural support, a most preferred width fulfills the condition: 2 mm $< H_W <$ 8 mm.

Reverting to the cutting tool assembly 400, the square parting blade 402 has an identical parting blade height $H_I$ and parting blade length $L_I$.

To provide perspective, actual dimensions of a first tested prototype configured to part a workpiece (not shown) having a diameter of 80 mm are as follows: $H_R$=64 mm; $L_I$=$H_I$=$L_P$=$H_P$=60 mm; $L_H$=50 mm; $H_S$=25 mm).

It is noted that the above dimensions may be provided to any common standard shank size (e.g. square cross sectional shanks having a shank height $H_S$ from 19 mm to 32 mm).

In the example given: $L_P/L_H$=1.2, which is a slightly less compact version than the previous embodiment. However the extent to how rearward the pocket may be designed is variable.

In a newly designed version, basically identical to that shown, but for parting a workpiece (not shown) having a diameter of 120 mm, the dimensions are as follows: $H_R$=95 mm; $L_I$=$H_I$=$L_P$=$H_P$=90 mm; $L_H$=67 mm; $H_S$=19-32 mm).

In the new design: $L_P/L_H$=1.34, which is more compact version than the previous embodiment in FIG. 24.

It is noted that the four-way indexable prototype was found to be extremely stable and for a workpiece having a diameter of 80 mm, a parting blade thickness of 2 mm was found to be easily sufficient. It is believed that such stability even allows the parting blade thickness to be between 1.2 mm to 1.6 mm while still providing excellent stability, such thicknesses being believed to be revolutionary for a parting blade of such large depth of cut, in addition to the multiple advantages described above.

Referring now to FIGS. 21A to 23E, yet another cutting tool assembly 500 is shown. Further to the development of the four-insert-seat parting blade 402, it was discovered that a three-insert-seat parting blade 502 may allow an even more compact tool holder 504 and a version tested has shown excellent stability, even though the tool life of the parting blade 502 is relatively reduced due to having one less insert seat 506.

The prototype cutting tool assembly 500 exemplified does not show a coolant construction although one can be provided if desired. Additionally, during development, even further unique features were developed which can be applied to other shaped parting blades.

As the similar features to the previous embodiments are readily apparent from the drawings, only notable new features developed will be discussed.

The parting blade 502 is provided with a plurality of through holes 510 (preferably threadless as per the other embodiments) namely, first, second, third and fourth through holes 510A, 510B, 510C, 510D. Notably, these through holes are not adjacent holes to the insert seats 506 and do not have a dual function. In addition, the through holes 512A, 512B, 512C adjacent to the insert seats 506 do have the dual function described above.

Notably, the tool holder 504 is provided with first and second threaded holder holes 514A, 514B configured to be aligned with the through holes 512A, 512B, 512C.

Similarly, the tool holder 504 is provided with third and fourth threaded holder holes 516A, 516B configured to be aligned with the first, second, third and fourth through holes 510A, 510B, 510C, 510D.

Figure 23A:
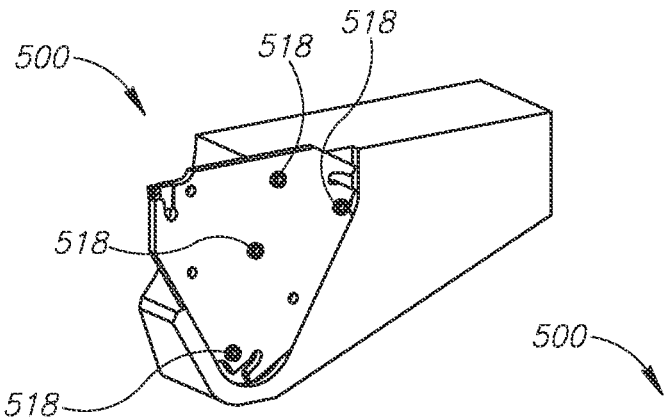
FIG. 23A is a front perspective view of a tool assembly including the parting blade in FIG. 21A and the tool holder in FIG. 22A, as well as screws and a cutting insert.
Figure 23B:
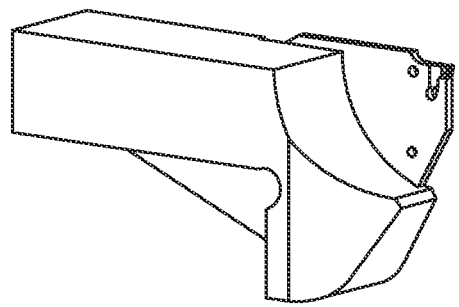
FIG. 23B is a rear perspective view of the tool assembly in FIG. 23A.

Noting that the screws 518 are best shown in FIG. 23A it will be understood that this embodiment is secured with four screws 518.

Generally speaking, it is believed to be a separately inventive aspect to provide a cutting tool assembly comprising a parting blade and tool holder, where a portion of the holes of the parting blade are dual use holes and a portion are single use holes, as described above.

The tool holder 504 comprises two tool abutment surfaces (i.e. larger and smaller side wall portions 520, 522).

Figure 22B:
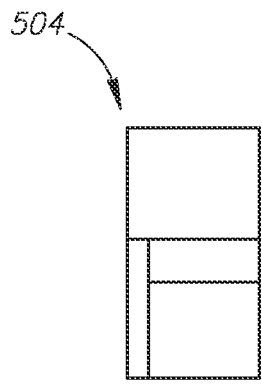
FIG. 22B is a rear view of the tool holder in FIG. 22A.
Figure 22D:
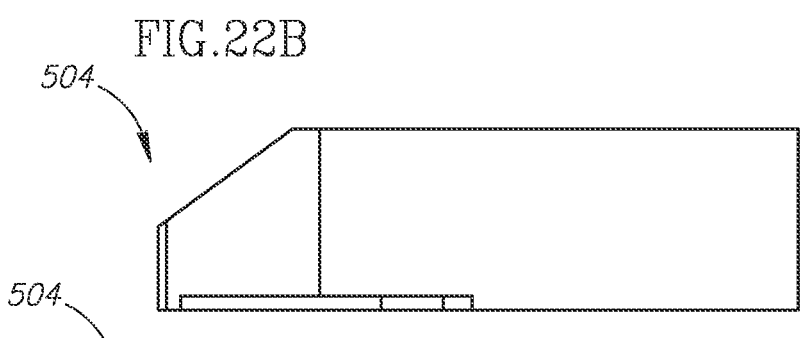
FIG. 22D is a top view of the tool holder in FIG. 22A.
Figure 22A:
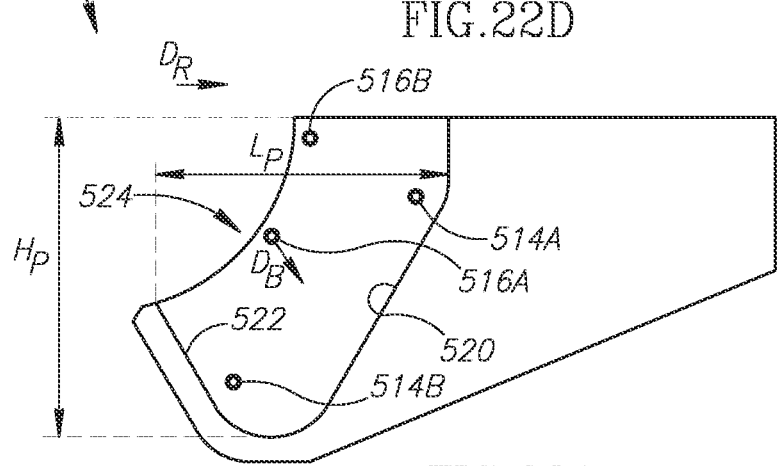
FIG. 22A is a side view of a tool holder configured to hold the parting blade in FIG. 21A.
Figure 22C:
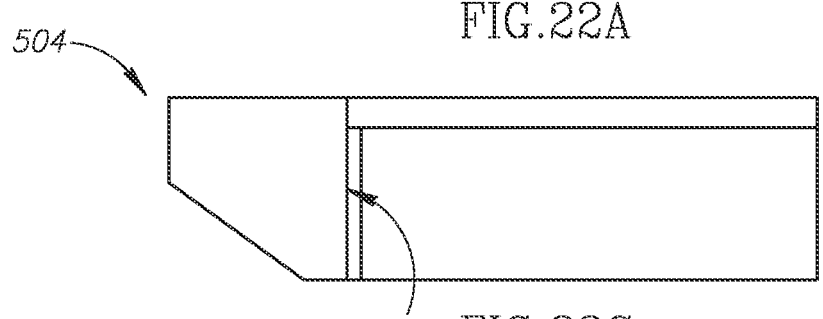
FIG. 22C is a bottom view of the tool holder in FIG. 22A.

The first through hole 510A and the third threaded hole 516A are offset relative to each other to provide the biasing force $D_B$ shown in FIG. 22A. Preferably the biasing force $D_B$ is directed towards the larger side wall portion 520. Even more preferably, the biasing force $D_B$ is directed towards the larger side wall portion 520, at a section thereof which is closer to the smaller side will portion 522 than to the middle of the larger side wall portion 520.

While not shown, rather than an offset, the third threaded hole 516A can be configured to provide a biasing force in a similar manner to the previous embodiment, e.g. with a so-called "lateral plunger".

Figure 23C:
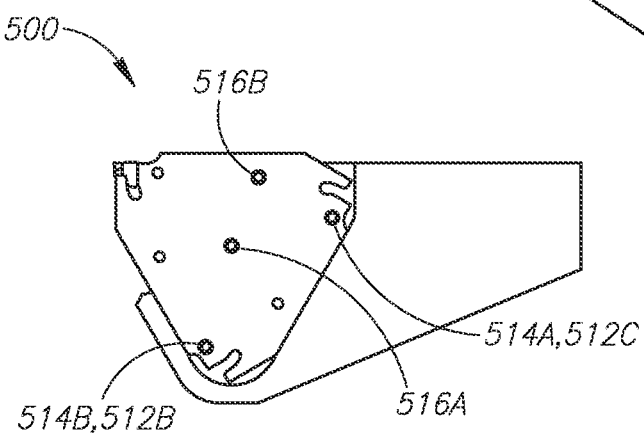
FIG. 23C is a side view of the tool assembly in FIG. 23A.
Figure 23D:
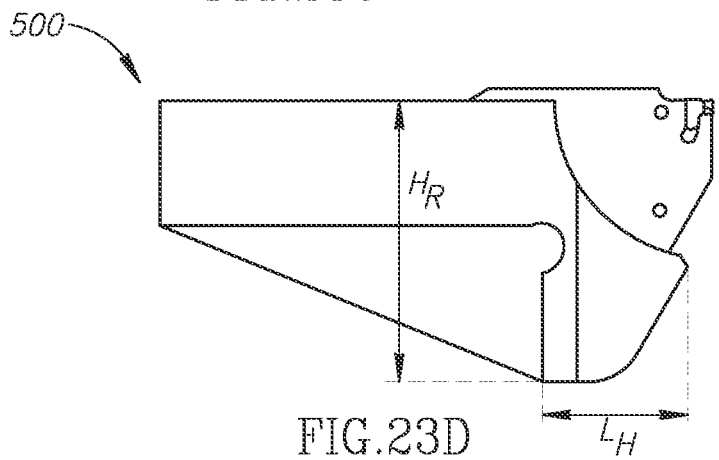
FIG. 23D is an opposite side view to that shown of the tool assembly in FIG. 23C.

FIG. 23C schematically shows an example of which holes are aligned.

Notably the pocket 524 extends even further rearwardly of a tool head's rear surface 526 than in previous embodiments. Similar to the previous embodiment, an entire side wall portion (in this example designated 520) can be rearwardly located relative to the rear surface 526.

Reverting to the cutting tool assembly 500 dimensions of a first tested prototype configured to part a workpiece (not shown) having a diameter of 80 mm are as follows: $H_R$=72 mm; $L_I$=70 mm; $H_I$=68 mm; $L_P$=66 mm; $H_P$=68 mm; $L_H$=37 mm; $H_S$=25 mm).

It is noted that the above dimensions may be provided to any common standard shank size (e.g. square cross sectional shanks having a shank height $H_S$ from 19 mm to 32 mm).

In the example given: $L_P/L_H$=1.78, which is significantly more compact than the previous embodiments. Thus, even with less insert seats, such embodiment is advantageous.

In view of the parting blades with three, four and five insert seats shown, it is noted that while any number of insert seats is theoretically possible the most preferred number is 3 to 6 insert seats. Certainly, three insert seats provide a clear advantage over one or two, while even a single insert seat is certainly a feasible option. However more than six insert seats presents a difficulty in chip evacuation (with the insert seats becoming closer circumferentially with each added insert seat). Nonetheless, since this concept may be feasible for very large depths of cut, the parting blades could feasibly have many insert seats. Conversely, since each insert seat is an additional cost, even a parting blade with one or more insert seats can be provided.

Referring to FIGS. 25A to 25E, a further example tool holder 704 is shown which is similar to those described above, particularly the tool holder designated "404" (although it will be understood that the additional features described hereinafter can be applied to any of the above-described tool holder examples or aspects). Accordingly, only notable features are described hereinafter.

While it has been stated that a tool shank according to the present invention can have different cross sections, unusual advantages have been found for a tool shank comprising a tapered or so-called dovetail-shaped cross-section, as shown in the present example.

Further to development of the example tool holders described above, which were conceived for standard horizontal axis machining, the present example was designed for vertical axis machining, i.e. similar to the design shown in FIG. 2.

While any number of different tool shank cross-sections could be used, it is noted that there are different machine interface connection types, each requiring a different shank-cross section. Accordingly, it the present concept is to develop a single tool holder (hereinafter "first tool holder") which could be compatible for multiple interfaces by mounting it in a so-called "second tool holder", which are already marketed, albeit intended for directly holding parting blades with tapered edges of the type exemplified in FIG. 2.

Accordingly, an example of a first tool holder 704 is shown in FIGS. 25A to 26E. It will be understood that aside from the shank cross section, it can be modified to have any of the features according to the above aspects of the present invention.

More precisely, the first tool holder 704 comprises a reinforcement portion 752 supporting a tool head 754 and the abovementioned tool shank 760.

The tool head 754 comprises a pocket 756 having, *inter alia*, a pocket surface 744 and a rear surface 758.

The tool shank 760 comprises uppermost and lowermost shank surfaces 774, 776 connected by a second shank side surface 780 located on an opposite side of the first tool holder 704 from the reinforcement portion 752.

The shank connecting surface 780 can typically extend parallel with a shank axis As (see FIG. 25D) extending along the length and through the center of the tool shank 760.

Figure 26C:
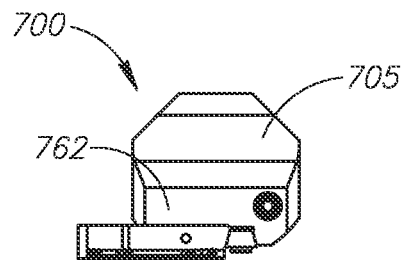
FIG. 26C is a front view of the tool assembly in FIG. 26A.
Figures 26A, 26D, 26E:
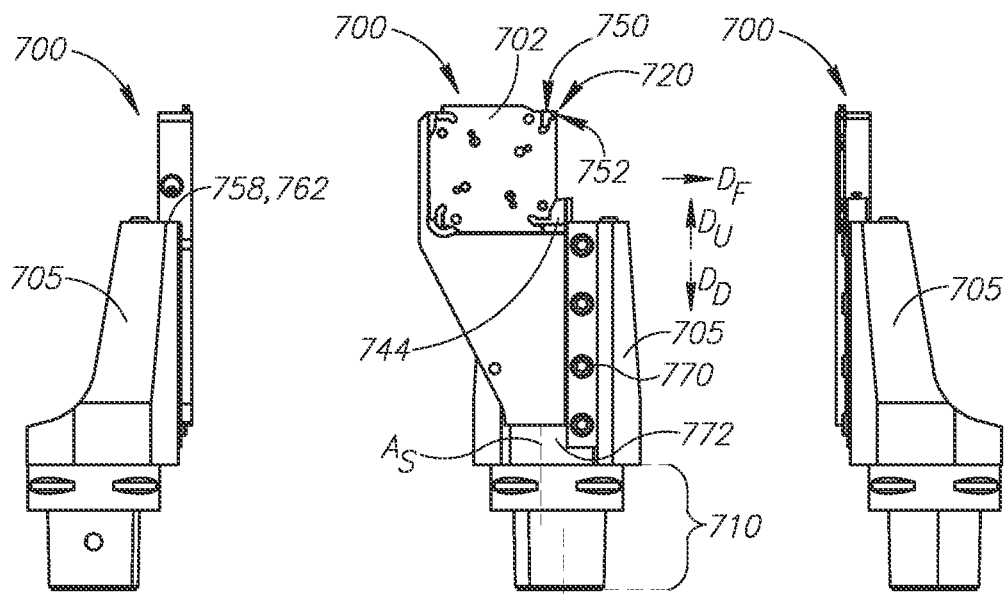
FIG. 26A is a side view of a tool assembly including a parting blade similar to that shown FIG. 18A and the tool holder in FIG. 25A, as well as screws and a cutting insert.
FIG. 26D is a bottom view of the tool assembly in FIG. 26A.
FIG. 26E is a top view of the tool assembly in FIG. 26A.
Figure 26B:
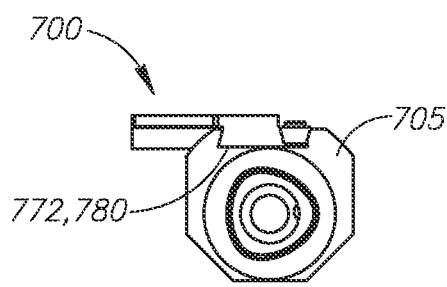
FIG. 26B is a rear view of the tool assembly in FIG. 26A.

In a plane perpendicular to the shank axis As, the uppermost and lowermost shank surfaces 774, 776, at least adjacent to the second shank side surface 780, taper towards each other with increasing distance from the second shank side surface 780. This allows them to be wedged in corresponding jaws similar to those described in embodiments above, as seen in FIG. 26B.

Consequently, the tool holder 704 can be clamped to known types of holders 705 such as that exemplified in FIGS. 26A-26E (or, for example, those shown in FIGS. 1 and 2).

Such tool assembly 700 is somewhat counterintuitive in that it comprises a first tool holder 704 held by a second tool holder 705 (the first tool holder 704 holding a parting blade 702 which in turn holds a cutting insert 720). Typically, each additional non-integral component reduces the rigidity of a tool assembly. Accordingly, it appears disadvantageous to have a tool holder held by another tool holder. Nonetheless, it was believed to be overall advantageous to not have to provide several different types of tool holders, each with a different shank shape (such as the tool shank 710 exemplified for the second tool holder 710) to match different machine interfaces.

An unexpected benefit found was that a tool holder with such tapered cross section can be thinner, and hence more compact, than a tool holder with a different cross section. Contrasting FIG. 19B and FIG. 25B, it will be understood that the comparative reinforcement portions have an identical reinforcement portion width $H_W$ but the overall width $H_{T1}$ of the tool holder 404 is larger than the overall width $H_{T2}$ of the first tool holder 704 with the tapered cross section. Stated differently, the shank portion width $H_{D1}$ of the tool holder 404 is larger than the shank portion width $H_{D2}$ of the tool holder 704 with the tapered cross section.

Without being bound to theory, it is believed that the width can be reduced without loss of stability, because when clamped the tapered uppermost and lowermost shank surfaces 774, 776 provide a pulling force, pulling the tool shank 760 into a pocket 772 (FIG. 26A) of the second tool holder 705. Such force not being provided in the previous examples shown.

In view of the comparatively compact design, such tapered shank portion design was subsequently considered beneficial for even clamping to a normal horizontal axis tool holder such as that shown in FIG. 1 (with the parting blade being oriented accordingly).

It will be noted that to achieve vertical axis machining the orientation of the cutting insert 720 (and associated parting blade 702) has been changed so that the insert's rake surface 750 is basically perpendicular to a shank axis As (see FIG. 25D) extending along the length of the tool shank 760. Stated differently, the insert's relief surface 752 of the cutting insert 720 is basically parallel to the shank axis $A_S$.

Figure 25C:
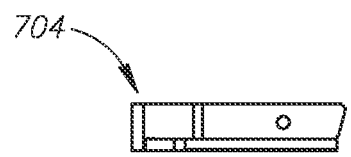
FIG. 25C is a front view of the tool holder in FIG. 25A.
Figure 25E:
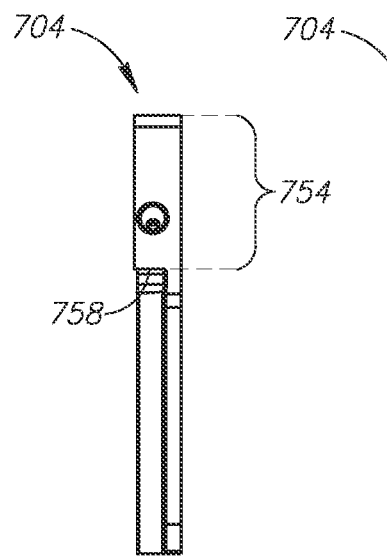
FIG. 25E is a top view of the tool holder in FIG. 25A.
Figure 25A:
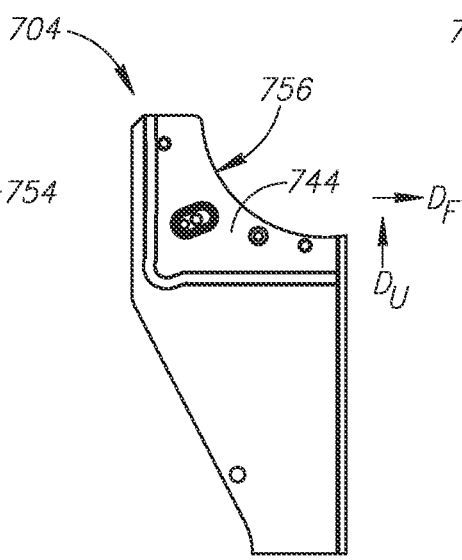
FIG. 25A is a side view of a tool holder similar to that shown in FIG. 19A.
Figure 25D:
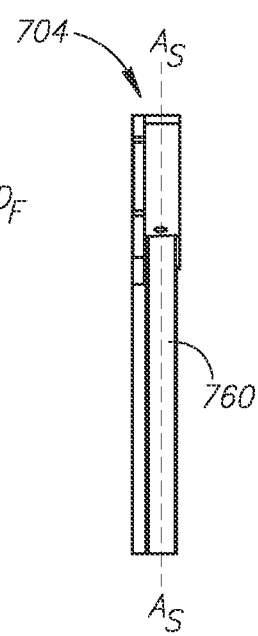
FIG. 25D is a bottom view of the tool holder in FIG. 25A.
Figure 25B:
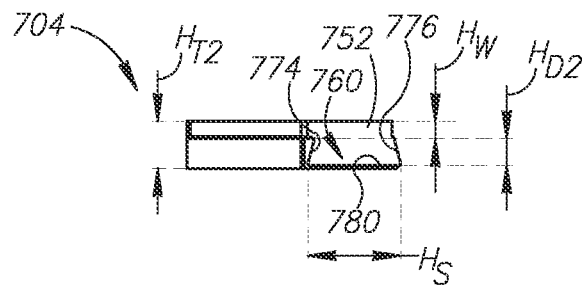
FIG. 25B is a rear view of the tool holder in FIG. 25A.

One preferred embodiment (referring to the side view of the first tool holder 704 shown in FIG. 25A) shows the pocket surface 744 opening out to the forward direction $D_F$, which happens to be to the right of the page, rather than the left direction as exemplified in the example tool holder 404 as shown in FIG. 19A. This different direction was utilized since the traditional forward direction ($D_F$, as shown in FIG. 26A) for vertical axis machining is to the right of the page. There may be applications where the orientation as shown in FIG. 19A is desired for vertical axis machining, however there is a general preference for the direction shown in FIG. 25A.

Notably, the pocket surface 744 is almost entirely raised above the second tool holder 705. Stated differently, the cutting insert 720 is located above the second tool holder 705 (noting that the word above, is in reference to the upward direction $D_U$ in reference to the second tool holder axis $A_{PT}$).

It will be understood that this large distance of the cutting insert 720 from the machine tool interface (not shown, but understood to be connected to the tool shank 710) is disadvantageous since it greatly increases the overhang of the entire assembly 700 and hence reduces stability thereof.

The reason that this was construction was preferred was to allow access to the screws 770 of the second tool holder 705.

An alternative design (not shown) is to lower a pocket surface to the same height as the screws but with a cutting insert, and a large portion if not an entirety of the pocket surface, being located further in the forward direction $D_F$ than the second tool holder. In such design, for example, an open portion can allow access to the screws. Such design being advantageous in that the overhang can be greatly reduced and the height of the cutting insert can be varied relative to the second tool holder axis (by moving the first tool holder parallel thereto before fastening the screws).

However, such design could require modification for example, for different primary tool holders having differently located screws.

Accordingly, the presently shown, non-limiting but preferred, example with the cutting insert 720 located above the second tool holder 705 is exemplified as the preferred design. While there was significant concern regarding stability due to the extremely long overhang, testing has shown the assembly to be extremely stable.

Without being bound to theory, it is believed that the present example may be even more stable than, for example, the tool holder 404 in FIG. 19D. Notably, said tool holder 404 comprises a tool head 454 having a rear surface 458 which can, but may not, abut a corresponding turret surface when mounted to a turret. By contrast, a corresponding rear surface 758 of the tool head 754 of the first tool holder 704 of the present example (FIG. 25E) comes into natural abutment on the corresponding upper surface 760 of the second tool holder 705, sliding down until that contact is made. Furthermore, subsequent, and unlike during machining with tool holder 404, most of the machining forces are directed from the cutting insert 720 basically towards the upper surface 760, causing strong abutment of the rear surface 758 and upper surface 760. This is believed to cause the first tool holder 704 to be secured in a stable manner on the primary tool holder 705, offsetting the expected lack of stability from the long overhang.

It will be noted that a tool head is not necessarily required for the present type of first tool holder, but has found to be advantageous for at least said abovementioned abutment.

It is also noted that for small parting blade applications, even a reinforcement portion is not necessarily required.

The description above includes an exemplary embodiment and details and does not exclude non-exemplified embodiments and details from the claim scope of the present application.

What is claimed is:

1. A tool holder comprising:
a tool shank having a shank axis defining forward and rearward directions, and comprising:
opposing uppermost and lowermost shank surfaces which define upward and downward directions perpendicular to the shank axis;
first and second shank side surfaces which define first and second side directions perpendicular to the shank axis and the upward and downward directions;
a shank height (HS) measurable parallel to the upward and downward directions and perpendicular to the shank axis; and
a shank portion width (HD) measurable perpendicular to the upward and downward directions and the shank axis;
a tool head connected to and extending forward of the tool shank, the tool head having a rear surface; and
an insert seat or a blade pocket which is partially formed on both the tool head and the tool shank, and extends rearwardly of the tool head's rear surface, the insert seat or the blade pocket having a peripheral wall comprising a plurality of side wall portions and formed with a pocket opening;
wherein:
at least a portion of one of the side wall portions is located rearwardly of the tool head's rear surface.

2. The tool holder according to claim 1, wherein the insert seat or blade pocket is a blade pocket and the blade pocket is located at a side surface of the tool head.

3. The tool holder according to claim 1, wherein the insert seat or blade pocket is a blade pocket and the pocket opening opens out in the upward direction.

4. The tool holder according to claim 1, wherein the side wall portions are tapered.

5. The tool holder according to claim 1, wherein the insert seat or blade pocket is a blade pocket and comprising a clamp configured to hold a parting blade to the blade pocket.

6. The tool holder according to claim 5, wherein the peripheral wall comprises a first side wall portion extending from the blade pocket opening, and a second side wall portion located opposite the first side wall portion, the second side wall portion forming the clamp.

7. The tool holder according to claim 5, wherein the clamp is integral to the tool holder with one or more flexible connections.

8. The tool holder according to claim 1, wherein the insert seat or blade pocket comprises a pocket face which in turn comprises a threaded hole and a tool holder coolant outlet aperture, the threaded hole being located adjacent to the tool holder coolant outlet aperture.

9. The tool holder according to claim 1, wherein the insert seat or blade pocket is a blade pocket and the tool holder is configured to hold a parting blade in a single position providing a single overhang length.

10. The tool holder according to claim 1, wherein adjacent to at least a portion of the first shank side surface there is a blade shaped reinforcement portion connecting the first shank side surface and the tool head.

11. The tool holder according to claim 10, wherein at least a portion of one of the side wall portions is formed on the reinforcement portion.

12. The tool holder according to claim 1, wherein;
the insert seat or blade pocket is a blade pocket and the blade pocket comprises a pocket surface and one or more of the side wall portions; and
the tool holder further comprises a resilient biasing element located along the pocket surface and configured to provide a biasing force towards one of the side wall portions or an area to which two of the side wall portions converge.

13. The tool holder according to claim 1, wherein the insert seat or blade pocket is a blade pocket and the tool holder is configured to hold a parting blade only along a periphery thereof and with abutment to a pocket surface of the blade pocket.

14. The tool holder according to claim 1, wherein:
the tool head extends in the forward and downward directions from a front shank portion of the tool shank; and
the tool head's rear surface is formed on a portion of the tool head that extends in said downward direction from the front shank portion.

15. The tool holder according to claim 1, wherein:
except at the insert seat or blade pocket, the tool shank has a constant cross sectional shape, in a plane perpendicular to the shank axis; and
a largest dimension of a cross section of the tool head taken perpendicular to and intersecting the insert seat or blade pocket, is larger than the shank height (HS) and/or the shank portion width (HD).

16. The tool holder according to claim 1, wherein the entirety of said one of the side wall portions is located rearwardly of the tool head's rear surface.

17. The tool holder according to claim 16, wherein a tool shank height HS is smaller than the pocket height HP.

18. The tool holder according to claim 17, fulfilling the condition: $HP \geq 1.5HS$.

19. The tool holder according to claim 18, fulfilling the condition: $HP \geq 2HS$.

20. The tool holder according to claim 1, wherein the insert seat or blade pocket comprises a pocket surface and exactly two side wall portions.

21. The tool holder according to claim 20, wherein the two side wall portions are oriented at a right angle to each other.

22. A tool assembly comprising:
a tool holder according to claim 1, and either a parting blade or a cutting insert mounted therein;
wherein:
the tool head comprises a different cross section to the tool shank; and
a portion of the parting blade or cutting insert extends rearward of the tool head's rear surface.

23. The tool assembly according to claim 22, wherein the insert seat or blade pocket is a blade pocket and the cutting insert or parting blade is a parting blade, and the parting blade comprises: opposing first and second side surfaces extending between and peripheral edges, and an insert seat.

24. The tool assembly according to claim 23, wherein the parting blade is devoid of threaded holes between the opposing first and second side surfaces.

25. The tool assembly according to claim 23, wherein the parting blade is not elongated and the parting blade comprises a plurality of insert seats.

26. The tool assembly according to claim 23, further comprising a cutting insert mounted to the parting blade, and the cutting insert comprises a cutting edge which is wider than the entire parting blade.

27. The tool assembly according to claim 23, wherein the parting blade comprises three to six insert seats.

28. A tool holder comprising:
a tool shank having a shank axis defining forward and rearward directions, and comprising:
  opposing uppermost and lowermost shank surfaces which define upward and downward directions perpendicular to the shank axis;
  first and second shank side surfaces which define first and second side directions perpendicular to the shank axis and the upward and downward directions;
  a shank height (HS) measurable parallel to the upward and downward directions and perpendicular to the shank axis; and
  a shank portion width (HD) measurable perpendicular to the upward and downward directions and the shank axis;
a tool head connected to and extending forward of the tool shank, the tool head having a rear surface; and
  an insert seat or a blade pocket which is partially formed on both the tool head and the tool shank, and extends rearwardly of the tool head's rear surface, the insert seat or the blade pocket having a peripheral wall comprising a plurality of side wall portions and formed with a pocket opening;
wherein:
  the insert seat or the blade pocket has a pocket length ($L_P$);
  the tool head has a tool head length ($L_H$); and
  the pocket length ($L_P$) is greater than the tool head length ($L_H$) by at least 10%.

29. The tool holder according to claim 28, wherein the pocket length ($L_P$) is greater than the tool head length ($L_H$) by at least 20%.

30. The tool holder according to claim 28, wherein the insert seat or blade pocket is a blade pocket and the pocket opening opens out in the upward direction.

31. The tool holder according to claim 28, wherein the entirety of at least one of the side wall portions is located rearwardly of the tool head's rear surface.

* * * * *